(12) United States Patent
Moriya et al.

(10) Patent No.: US 11,565,689 B2
(45) Date of Patent: Jan. 31, 2023

(54) VEHICLE CONTROL APPARATUS

(71) Applicant: SUBARU CORPORATION, Tokyo (JP)

(72) Inventors: Fumiyuki Moriya, Tokyo (JP); Hirofumi Yabe, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 181 days.

(21) Appl. No.: 17/060,490

(22) Filed: Oct. 1, 2020

(65) Prior Publication Data

US 2021/0122355 A1 Apr. 29, 2021

(30) Foreign Application Priority Data

Oct. 25, 2019 (JP) .............................. JP2019-194195

(51) Int. Cl.
*B60W 20/13* (2016.01)
*B60W 50/14* (2020.01)
*B60W 10/06* (2006.01)
*B60W 10/08* (2006.01)
B60W 40/076 (2012.01)

(52) U.S. Cl.
CPC ............ *B60W 20/13* (2016.01); *B60W 10/06* (2013.01); *B60W 10/08* (2013.01); *B60W 50/14* (2013.01); B60W 40/076 (2013.01); B60W 2510/244 (2013.01); B60W 2520/10 (2013.01)

(58) Field of Classification Search
CPC .... B60W 20/13; B60W 20/10; B60W 30/182; B60W 10/06; B60W 10/08; B60W 50/14; B60W 40/076; B60W 2510/244
See application file for complete search history.

(56) References Cited

U.S. PATENT DOCUMENTS

2011/0202210 A1 8/2011 Goda
2014/0180515 A1* 6/2014 Ueda ...................... B60L 50/61
180/65.265
2022/0126813 A1* 4/2022 Miyazato .............. B60W 20/13

FOREIGN PATENT DOCUMENTS

JP 2008-137543 A 6/2008

* cited by examiner

Primary Examiner — George C Jin
(74) Attorney, Agent, or Firm — McGinn I.P. Law Group, PLLC.

(57) ABSTRACT

A vehicle control apparatus includes a condition determining unit, a mode switching controller, and a notification controller. The condition determining unit is configured to determine whether enabling conditions set to enable a switching control to an engine stop mode are satisfied. The engine stop mode stops an engine of a vehicle in a driving state. The mode switching controller is configured to perform the switching control to the engine stop mode in response to that the condition determining unit determines that the enabling conditions are satisfied. The notification controller is configured to compare a measured time value and a threshold both related to the enabling condition which the condition determining unit determines as not being satisfied. The notification controller is configured to perform, in response to that the measured time value exceeds the threshold, a control of making notification that the switching control is in a disabled state.

20 Claims, 12 Drawing Sheets

VEHICLE CONTROL APPARATUS

CROSS-REFERENCE TO RELATED APPLICATIONS

The present application claims priority from Japanese Patent Application No. 2019-194195 filed on Oct. 25, 2019, the entire contents of which are hereby incorporated by reference.

BACKGROUND

The technology relates to a technical field of a vehicle control apparatus that performs a switching control of a traveling mode.

A vehicle is known that performs, when the vehicle is traveling, a switching control between an engine traveling mode, which causes the vehicle to travel with use of power from an engine, and an electric vehicle (EV) traveling mode, which causes the vehicle to travel with use of power of a rotating electrical device such as a motor while the engine is stopped.

Japanese Unexamined Patent Application Publication No. 2008-137543 discloses a vehicle that notifies a user, by turning on a lamp, that switching from the engine traveling mode to the EV traveling mode is disabled at such a timing. The vehicle also notifies the user of a cause making the switching disabled, by displaying information regarding the cause on a device such as a multi-function display (MFD).

SUMMARY

An aspect of the technology provides a vehicle control apparatus that includes a condition determining unit, a mode switching controller, and a notification controller. The condition determining unit is configured to determine whether two or more enabling conditions are satisfied. The enabling conditions are set to enable a switching control to an engine stop mode. The switching control to the engine stop mode is a control of performing switching to the engine stop mode. The engine stop mode is a mode that stops an engine of a vehicle while the vehicle is in a driving state. The mode switching controller is configured to perform the switching control to the engine stop mode in response to that the condition determining unit determines that the enabling conditions are satisfied. The notification controller is configured to compare a measured time value and a threshold with each other that are both related to the enabling condition, of the two or more enabling conditions, which the condition determining unit determines as not being satisfied. The notification controller is configured to perform, in response to that the measured time value exceeds the threshold, a control of making notification that the switching control to the engine stop mode is in a disabled state.

An aspect of the technology provides a vehicle control apparatus that includes circuitry. The circuitry is configured to determine whether two or more enabling conditions are satisfied. The enabling conditions are set to enable a switching control to an engine stop mode. The switching control to the engine stop mode is a control of performing switching to the engine stop mode. The engine stop mode is a mode that stops an engine of a vehicle while the vehicle is in a driving state. The circuitry is configured to perform the switching control to the engine stop mode in response to that the enabling conditions are determined as being satisfied. The circuitry is configured to compare a measured time value and a threshold with each other that are both related to the enabling condition, of the two or more enabling conditions, which is determined as not being satisfied. The circuitry is configured to perform, in response to that the measured time value exceeds the threshold, a control of making notification that the switching control to the engine stop mode is in a disabled state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
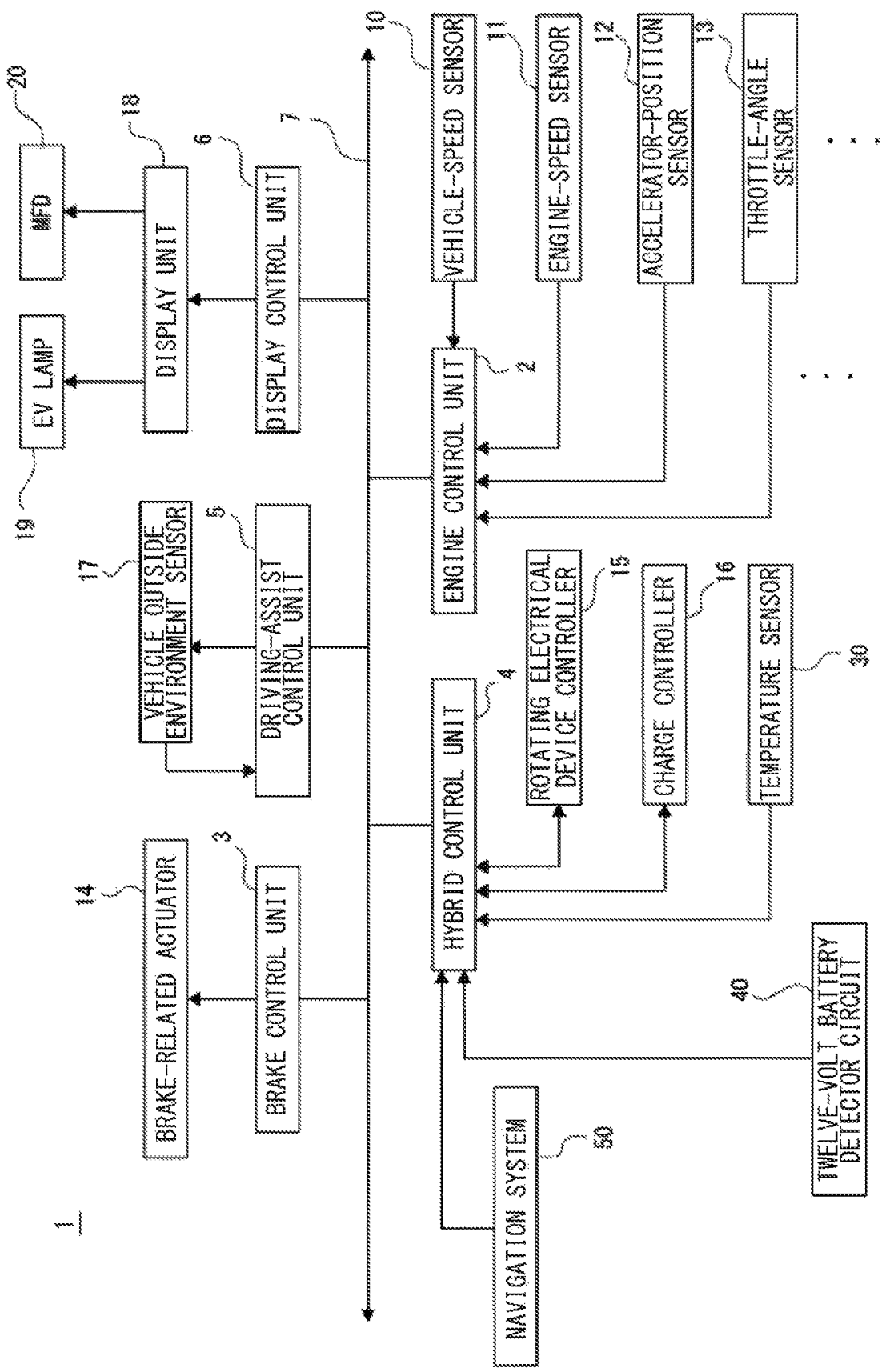
FIG. 1 is a block diagram illustrating an example of a configuration of a vehicle control system according to one example embodiment of the technology.

In some situations, a switching control from an engine traveling mode to an EV traveling mode is disabled, and a user may be notified of the disabled state of the switching control, for example, by a lamp being turned on, every time when the switching control is disabled. However, such notification can be troublesome for the user, for example, in a case where the disabled state of the switching control is apparent. Further, if notification of a cause that has brought the switching control to the EV traveling mode in the disabled state is made for the user every time when the switching control is disabled, an amount of information increases, which can confuse the user. On the other hand, it is not appropriate to eliminate all notification of the disabled state of the switching control.

It is desirable to make notification, at an appropriate timing, that a switching control to an EV traveling mode is in a disabled state.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

1. Configuration of Vehicle Control System

FIG. 1 is a block diagram illustrating an example of a configuration of a vehicle control system 1 according to an example embodiment of the technology. Note that FIG. 1 only extracts a part of the configuration of the vehicle control system 1.

The vehicle control system 1 may be provided in a vehicle such as a hybrid vehicle that includes an engine and a rotating electrical device as power sources for driving wheels. The vehicle control system 1 may include, as vehicle-mounted control devices, an engine control unit 2, a brake control unit 3, a hybrid control unit 4, a driving-assist control unit 5, and a display control unit 6. These control units may each include a microcomputer including, for example, a central processing unit (CPU), a read-only memory (ROM), and a random-access memory (RAM). These control units may be coupled to each other via a bus wiring 7 to perform mutual communication.

The communication between the control units via the bus wiring 7 may be based on a communication standard such as a controller area network (CAN). Hereinafter, a communication path using the bus wiring 7 is referred to as a "bus communication path".

The engine control unit 2 may perform various engine driving controls for the engine of the vehicle including, without limitation, a fuel injection control, an ignition control, and a suction-air amount adjustment control. Coupled to the engine control unit 2 may be various sensors related to an engine control including, without limitation: a vehicle-speed sensor 10 that detects a traveling speed of the vehicle as a vehicle speed; an engine-speed sensor 11 that detects a speed of the engine; an accelerator-position sensor 12 that detects an amount of depression of an accelerator pedal as an accelerator position; and a throttle-angle sensor 13 that detects an angle of a throttle valve as a throttle angle. The engine control unit 2 may use detected values of these sensors to perform the engine driving controls.

The engine control unit 2 may supply the detected values of the various sensors to any control unit such as the hybrid control unit 4 via the bus wiring 7 on an as-needed basis.

The brake control unit 3 may control various actuators, which are each provided as a brake-related actuator 14, on the basis of a detection signal from a predetermined sensor, data of operation input performed by an occupant such as a driver, or any other data, for example. Examples of the brake-related actuator 14 may include a hydraulic control actuator adapted to control, for example, an output hydraulic pressure from a brake booster to a master cylinder or a hydraulic pressure in a brake fluid pipe. The brake control unit 3 may also perform other controls such as an automatic braking control to avoid a contact of the vehicle with another object on the basis of an instruction given from the driving-assist control unit 5.

The hybrid control unit 4 may give an instruction to the engine control unit 2, the rotating electrical device controller 15, and the charge controller 16 on the basis of: the operation input performed by the occupant such as the driver; data regarding a traveling environment received from any unit or any device such as the engine control unit 2, a temperature sensor 30, a twelve-volt battery detector circuit 40, or a navigation system 50; or any other data, to control operation of the vehicle.

The rotating electrical device controller 15 may perform a drive control of a rotating electrical device, such as a motor-generator, for traveling provided in the vehicle, on the basis of an instruction given from the hybrid control unit 4. The charge controller 16 may perform a charging control of a high-voltage battery on the basis of an instruction given from the hybrid control unit 4. The high-voltage battery may be provided in the vehicle as a power source of the rotating electrical device. In one non-limiting example, the charge controller 16 may perform a control of charging the high-voltage battery on the basis of electric power generated by regenerative rotation of the rotating electrical device such as the motor-generator.

The hybrid control unit 4 may calculate required torque T (i.e., torque to be outputted to the wheels) in accordance with an amount of operation performed on the accelerator by the driver, on the basis of an accelerator position value received from the engine control unit 2. The hybrid control unit 4 may cause the engine control unit 2 and the rotating electrical device controller 15 to execute an operation control of the engine and the rotating electrical device for causing the vehicle to travel with use of required driving force corresponding to the calculated required torque T. The hybrid control unit 4 may also cause, on the basis of a state of charge (SOC) of the high-voltage battery, the charge controller 16 to execute the control of charging the high-voltage battery.

A hybrid vehicle involves, as its traveling mode, an EV traveling mode and an engine traveling mode. The hybrid control unit 4 may switch the traveling mode between the EV traveling mode and the engine traveling mode in accordance with a state of the vehicle. The EV traveling mode may cause the vehicle to travel with use of power from the rotating electrical device while the engine is stopped. In the EV traveling mode, the hybrid control unit 4 may calculate torque required for the rotating electrical device on the basis of the required torque T calculated on the basis of the accelerator position value. The torque required for the rotating electrical device is hereinafter referred to as "required torque Tb". Further, the hybrid control unit 4 may supply data regarding the required torque Tb to the rotating electrical device controller 15 to control the operation of the rotating electrical device.

In the engine traveling mode, the hybrid control unit 4 may calculate torque required for the engine and the required torque Tb of the rotating electrical device on the basis of the required torque T. The torque required for the engine is hereinafter referred to as "required torque Te". The hybrid control unit 4 may supply data regarding the required torque Te to the engine control unit 2 and may supply data regarding the required torque Tb to the rotating electrical device controller 15, to thereby control the operation of the engine and the rotating electrical device.

In one non-limiting example, in the engine traveling mode, the hybrid control unit 4 may calculate the required torque Te and supply the data regarding the required torque Te to the engine control unit 2 to thereby control only the engine.

Coupled to the hybrid control unit 4 may be the temperature sensor 30 that detects a temperature of a device such as the engine or a twelve-volt battery (a low-voltage battery). The hybrid control unit 4 may control switching of the traveling mode with use of a detected value of the temperature sensor 30 coupled to the hybrid control unit 4.

The twelve-volt battery detector circuit 40 may detect an internal resistance of the twelve-volt battery for starting the engine. The hybrid control unit 4 may acquire data regarding the internal resistance of the twelve-volt battery via the twelve-volt battery detector circuit 40 as data to be used for the switching control of the traveling mode.

The twelve-volt battery may be typically a lead-acid battery. The twelve-volt battery may supply electric power stored therein to a starter to start the engine. On this occasion, the twelve-volt battery may also supply the stored electric power to a fuel pump, a fuel injection device, and an ignition device. The twelve-volt battery may store electric power generated by an alternator attached to the engine. The twelve-volt battery may also be coupled to electrical devices including, without limitation, various controllers, an air conditioner, and lamps.

The navigation system 50 may comprehensively refer to a configuration adapted for a navigation process. The navigation system 50 may include, for example but not limited to: a microprocessor that performs a process such as route guidance or current location display; a map database; a display device; an input device; and an audio output device. The navigation system 50 may have a publicly-known configuration and may perform a publicly-known process, which is not described in detail here. According to the example embodiment, the hybrid control unit 4 may acquire, from the navigation system 50, data to be used for the switching control of the traveling mode, such as road data.

The driving-assist control unit 5 may perform various driving-assist controls including, without limitation, an automatic-cruise control and a steering-assist control, for example. The driving-assist control unit 5 may use a detected value of a vehicle outside environment sensor 17 to perform these driving-assist controls. The vehicle outside environment sensor 17 may comprehensively refer to sensors including an imaging device adapted to detect an object that is present outside the vehicle, such as a preceding vehicle, a pedestrian, or a lane. The driving-assist control unit 5 may control each part, such as an accelerator or a steering wheel, required for the driving-assist control on the basis of data regarding the object detected on the basis of the detected value of the vehicle outside environment sensor 17.

Note that the sensor used to detect an object is not limited to the imaging device, and may be any other sensor such as a milliwave radar.

The display control unit 6 may perform a display control for various display units 18 provided in a part such as a meter panel in the vehicle. Non-limiting examples of the display units 18 may include: a display device adapted to present information with use of an EV lamp 19; a display device adapted to present information with use of an MFD 20; a display device adapted to present information with use of various meters provided in the meter panel, including, without limitation, a speedometer and a tachometer; and any other display device adapted to present information to the occupant such as the driver.

The display control unit 6 may turn on the EV lamp 19 to display information appropriately received from the hybrid control unit 4. The information received from the hybrid control unit 4 may include, for example: information that the traveling mode is set to the EV traveling mode; and information that the switching control to the EV traveling mode is in the disabled state. The switching control to the EV traveling mode refers to a control of performing switching to the EV traveling mode.

For example, the display control unit 6 may turn on the EV lamp 19 in green to display the information that the traveling mode is set to the EV traveling mode. For example, the display control unit 6 may turn on the EV lamp 19 in yellow to display the information that the switching control to the EV traveling mode is in the disabled state.

The display control unit 6 may also display, on the MFD 20, information regarding a cause that has brought the switching control to the EV traveling mode in the disabled state, for example. The display control unit 6 may also control display operation of the speedometer and the tachometer on the basis of values of the vehicle speed and the engine speed appropriately received from the engine control unit 2. In one example embodiment, the display control unit 6 may display the EV lamp 19 on the MFD 20.

Further coupled to the display control unit 6 may be a predetermined sensor such as an unillustrated outside-air temperature sensor that detects a temperature of air outside the vehicle. The display control unit 6 may perform a display control of the display unit 18 on the basis of a detected value of the coupled sensor. Note that the MFD 20 may be also used for displaying various types of information including, without limitation, a total mileage, the outside air temperature, and instantaneous fuel consumption of the vehicle.

2. Configuration of Hybrid Control Unit

In the vehicle control system 1 according to the example embodiment, at least one of the control units coupled to each other via the bus communication path may be provided with the following configuration. Described below is an example case where the hybrid control unit 4 is provided with the following configuration. Hereinafter, the hybrid control unit 4 is sometimes simply referred to as a "control unit 4".

Figure 2:
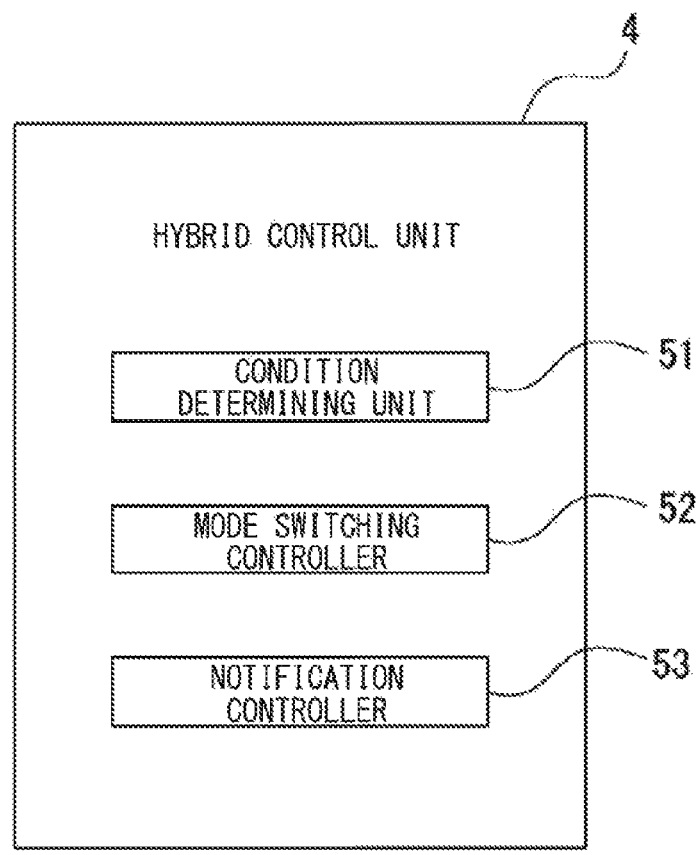
FIG. 2 is a block diagram illustrating an example of a configuration of a control unit according to one example embodiment.

FIG. 2 is a block diagram illustrating a configuration of the control unit 4 according to the example embodiment. As illustrated in FIG. 2, the control unit 4 includes a condition determining unit 51, a mode switching controller 52, and a notification controller 53.

The condition determining unit 51 may determine whether two or more enabling conditions are satisfied. The enabling conditions may be set to enable the switching control to the EV traveling mode. In one non-limiting example according the example embodiment, the enabling conditions may include an internal resistance of the twelve-volt battery, an SOC value of the high-voltage battery, an inclination rate of a slope, and the vehicle speed described in FIG. 3. For each of the enabling conditions, an enabling threshold th may be set which is required to be satisfied to perform the switching control to the EV traveling mode.

For example, for the enabling condition of the "internal resistance of the twelve-volt battery", an internal resistance required to start the engine may be set as an enabling threshold th1.

For example, for the enabling condition of the "SOC value of the high-voltage battery", an SOC value required to cause the vehicle to travel with use of the power from the rotating electrical device while the engine is stopped may be set as an enabling threshold th2.

For example, for the enabling condition of the "inclination rate of the slope", an absolute value of an inclination rate of a slope which the vehicle is required to travel with use of the power from the engine may be set as an enabling threshold th3.

For example, for the enabling condition of the "vehicle speed", surplus driving force obtained by subtracting, from maximum diving force, the required driving force calculated on the basis of the accelerator position may be set as an enabling threshold th4. Hereinafter, the "enabling threshold th" is used as a generic term for the enabling thresholds th1 to th4.

The condition determining unit 51 may determine whether the enabling conditions are satisfied on the basis of comparison between detected values for the respective enabling conditions and the enabling thresholds th set for the respective enabling conditions.

Although the absolute value of the inclination rate of the slope may be set as the enabling threshold th3 according to the example embodiment, the enabling threshold th3 may be set to each of an inclination rate of an upward slope and an inclination rate of a downward slope.

The mode switching controller 52 illustrated in FIG. 2 may perform the switching control from the engine traveling mode to the EV traveling mode when the condition determining unit 51 determines that all of the enabling conditions are satisfied. The mode switching controller 52 may perform the switching control from the EV traveling mode to the engine traveling mode when the condition determining unit 51 determines that any of the enabling conditions is no longer satisfied while the traveling mode is set to the EV traveling mode.

The notification controller 53 may compare a measured time value of the enabling condition that is determined as not being satisfied with a measurement threshold mt.

Here, the measured time value refers to a value measured from a measurement start timing st at which measurement is started of a time during which the enabling conditions are determined as not being satisfied. The measurement start timing st may be set to various timings. For example, the measurement start timing st may be set to a timing at which each of the enabling conditions is determined as being no longer satisfied, or may be set to a timing at which the number of the enabling condition remaining as not being satisfied becomes one.

The measurement threshold mt may be set for each of the enabling conditions. According to the example embodiment, a measurement threshold mt1 for the enabling condition of the "internal resistance of the twelve-volt battery" may be set to "4 seconds", a measurement threshold mt2 for the enabling condition of the "SOC value of the high-voltage battery" may be set to "30 seconds", a measurement threshold mt3 for the enabling condition of the "inclination rate of the slope" may be set to "4 seconds", and a measurement threshold mt4 for the enabling condition of the "vehicle speed" may be set to "3600 seconds". Note that the "measurement threshold mt" is used as a generic term for the measurement thresholds mt1 to mt4. The values of the respective measurement thresholds mt1 to mt4 according to the example embodiment are mere examples and may each be set to any value.

The notification controller 53 may perform a control of making notification that the traveling mode is set to the EV traveling mode. For example, the notification controller 53 may turn on the EV lamp 19 in green to make the notification that the traveling mode is set to the EV traveling mode.

Further, the notification controller 53 may perform a control of making notification that the switching control to the EV traveling mode is in the disabled state, when the measured time value exceeds the measurement threshold mt. On this occasion, for example, the notification controller 53 may turn on the EV lamp 19 in yellow to make the notification that the switching control to the EV traveling mode is in the disabled state.

This allows the user present in the vehicle to recognize that the traveling mode is currently set to the EV traveling mode or that the switching control to the EV traveling mode is currently in the disabled state for some cause.

Further, the notification controller 53 may perform, upon making the notification that the switching control to the EV traveling mode is in the disabled state, a control of making notification of the enabling condition that is determined as not being satisfied. For example, the notification controller 53 may cause, via the display control unit 6, the MFD 20 to display the enabling condition that is determined as not being satisfied. This allows the user present in the vehicle to recognize that the switching control to the EV traveling mode is currently in the disabled state and to also recognize which enabling condition is the cause that has brought the switching control to the EV traveling mode in the disabled state.

3. First Example Embodiment

Figure 3:
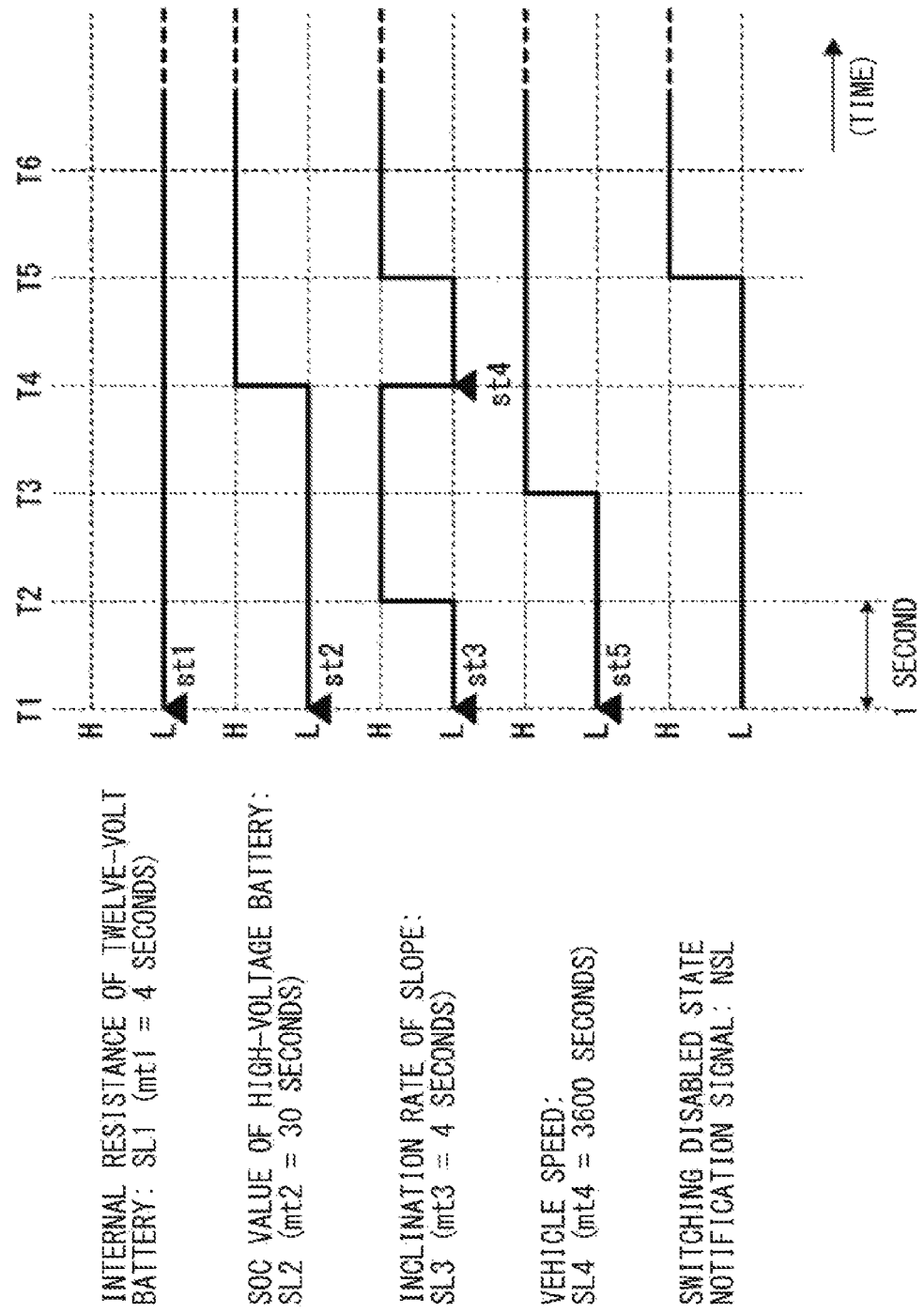
FIG. 3 is a timing chart illustrating an example of a control of making notification that a switching control is in a disabled state according to one example embodiment.

A first example embodiment of the technology is described with reference to FIGS. 3 to 6. FIG. 3 is a timing chart of a control of making notification that the switching control to the EV traveling mode is in the disabled state. In FIG. 3, time elapses in order of timings T1, T2, T3, and so on. The following description is given on an assumption that a time from one timing T to the next timing T (e.g., from the timing T1 to the timing T2) corresponds to one second. This also applies to FIG. 7 which will be described later.

According to the first example embodiment, for example, the internal resistance of the twelve-volt battery, the SOC value of the high-voltage battery, the inclination rate of the slope, and the vehicle speed may be set as the enabling conditions for the switching control to the EV traveling mode.

In FIG. 3, a condition determination state of each of the enabling conditions, i.e., whether each of the enabling conditions is satisfied, is represented by transition between an H-level and an L-level.

A waveform SL1 represents, by the H-level, that the enabling condition of the "internal resistance of the twelve-volt battery" is satisfied and represents, by the L-level, that the enabling condition of the "internal resistance of the twelve-volt battery" is not satisfied. In one specific but non-limiting example, if the internal resistance of the twelve-volt battery is equal to or less than the enabling threshold th1, the enabling condition of the "internal resistance of the twelve-volt battery" may be satisfied, which may be represented by the H-level. If the internal resistance of the twelve-volt battery exceeds the enabling threshold th1, the enabling condition of the "internal resistance of the twelve-volt battery" may not be satisfied, which is represented by the L-level.

A waveform SL2 represents, by the H-level, that the enabling condition of the "SOC value of the high-voltage battery" is satisfied and represents, by the L-level, that the enabling condition of the "SOC value of the high-voltage battery" is not satisfied. In one specific but non-limiting example, if the SOC value of the high-voltage battery exceeds the enabling threshold th2, the enabling condition of the "SOC value of the high-voltage battery" may be satisfied, which may be represented by the H-level. If the SOC value of the high-voltage battery is equal to or less than the enabling threshold th2, the enabling condition of the "SOC value of the high-voltage battery" may not be satisfied, which may be represented by the L-level.

A waveform SL3 represents, by the H-level, that the enabling condition of the "inclination rate of the slope" is satisfied and represents, by the L-level, that the enabling condition of the "inclination rate of the slope" is not satisfied. In one specific but non-limiting example, if the absolute value of the inclination rate of the slope is equal to or less than the enabling threshold th3, the enabling condition of the "inclination rate of the slope" may be satisfied, which may be represented by the H-level. If the absolute value of the inclination rate of the slope exceeds the enabling threshold th3, the enabling condition of the "inclination rate of the slope" may not be satisfied, which may be represented by the L-level.

A waveform SL4 represents, by the H-level, that the enabling condition of the "vehicle speed" is satisfied and represents, by the L-level, that the enabling condition of the "vehicle speed" is not satisfied. In one specific but non-limiting example, if the vehicle speed is equal to or less than the enabling threshold th4, the enabling condition of the "vehicle speed" may be satisfied, which may be represented by the H-level. If the vehicle speed exceeds the enabling threshold th4, the enabling condition of the "vehicle speed" may not be satisfied, which may be represented by the L-level.

A waveform NSL represents, by the H-level, a period in which the control unit 4 is making notification that the switching control to the EV traveling mode is in the disabled state and represents, by the L-level, a period in which the control unit 4 is not making the notification that the switching control to the EV traveling mode is in the disabled state. Accordingly, the control unit 4 may perform the control of making the notification that the switching control to the EV traveling mode is in the disabled state, at a rising timing, i.e., at a timing when the waveform NSL makes transition to the H-level.

Assume that the control unit 4 has started, from the timing T1, determining whether the enabling conditions are satisfied.

At the timing T1, all of the waveforms SL1, SL2, SL3, and SL4 are at the L-level. In other words, none of the enabling conditions are satisfied. Therefore, measurement of the measured time value may be started for each of the enabling conditions. In other words, a time length of a period during which the corresponding enabling condition is determined as not being satisfied may be measured.

Therefore, the timing T1 may be set as the measurement start timings st1, st2, st3, and st5 for the measured time values of the respective enabling conditions.

At the timing T2, the enabling conditions of the "internal resistance of the twelve-volt battery", the "SOC value of the high-voltage battery" and the "vehicle speed" are not satisfied, as indicated by the waveforms SL1, SL2, and SL4, respectively. However, the measured time values of the enabling conditions of the "internal resistance of the twelve-volt battery", the "SOC value of the high-voltage battery", and the "vehicle speed" have not reached the measurement threshold mt (or the measurement thresholds mt1, mt2, and mt4, respectively). Therefore, the timing T2 may not be a timing to make the notification that the switching control to the EV traveling mode is in the disabled state, as indicated by the waveform NSL.

At the timing T3, the enabling conditions of the "internal resistance of the twelve-volt battery" and the "SOC value of the high-voltage battery" are not satisfied, as indicated by the waveforms SL1 and SL2, respectively. However, the measured time values of the enabling conditions of the "internal resistance of the twelve-volt battery" and the "SOC value of the high-voltage battery" have not reached the measurement threshold mt (or the measurement thresholds mt1 and mt2, respectively). Therefore, the timing T3 may not be the timing to make the notification that the switching control to the EV traveling mode is in the disabled state.

At a timing T4, the enabling condition of the "internal resistance of the twelve-volt battery" is not satisfied, as indicated by the waveform SL1. However, the measured time value of the enabling condition of the "internal resistance of the twelve-volt battery" has not reached the measurement threshold mt1. Therefore, the timing T4 may not be the timing to make the notification that the switching control to the EV traveling mode is in the disabled state.

Note that, at the timing T4, the enabling condition of the "inclination rate of the slope" is no longer satisfied, as indicated by the waveform SL3. Therefore, the measurement of the measured time value of the enabling condition of the "inclination rate of the slope" may be started from the timing T4 set as the measurement start timing st4.

At a timing T5, the enabling condition of the "internal resistance of the twelve-volt battery" is not satisfied, as indicated by the waveform SL1. Further, the measured time value of the enabling condition of the "internal resistance of the twelve-volt battery" reaches the measurement threshold mt1 (e.g., 4 seconds) at the timing T5. Therefore, the timing T5 may be the timing to make the notification that the switching control to the EV traveling mode is in the disabled state, as indicated by the waveform NSL. Accordingly, the control unit 4 may perform the control of making the notification that the switching control to the EV traveling mode is in the disabled state.

That is, the control unit 4 may perform the measurement of the measured time value of each of the enabling conditions from the timing at which the corresponding enabling condition is no longer satisfied. Further, the control unit 4 may perform the control of making the notification that the switching control to the EV traveling mode is in the disabled state when any of the measured time values reaches the measurement threshold mt set for the corresponding enabling condition.

An example of a process for the control unit 4 to execute the above-described control is described below with reference to FIGS. 4 to 6. Flags F1 to F4 appearing in the following description are collectively referred to as a "flag F".

The flag F may be provided for each of the enabling conditions. An ON state of the flag F indicates that the corresponding enabling condition is determined by the control unit 4 as being satisfied. The control unit 4 may use the flag F to manage the state of each of the enabling conditions described with reference to FIG. 3, i.e., whether each of the enabling conditions is satisfied or not.

When the flags F of all of the enabling conditions are set to the ON state, the control unit 4 may perform the switching control from the engine traveling mode to the EV traveling mode.

In contrast, an OFF state of the flag F indicates that the corresponding enabling condition is determined by the control unit 4 as not being satisfied. If any one of the flags F is in the OFF state, the control unit 4 may be in a switching disabled state in which the control unit 4 is not allowed to perform the switching control from the engine traveling mode to the EV traveling mode.

Figure 4:
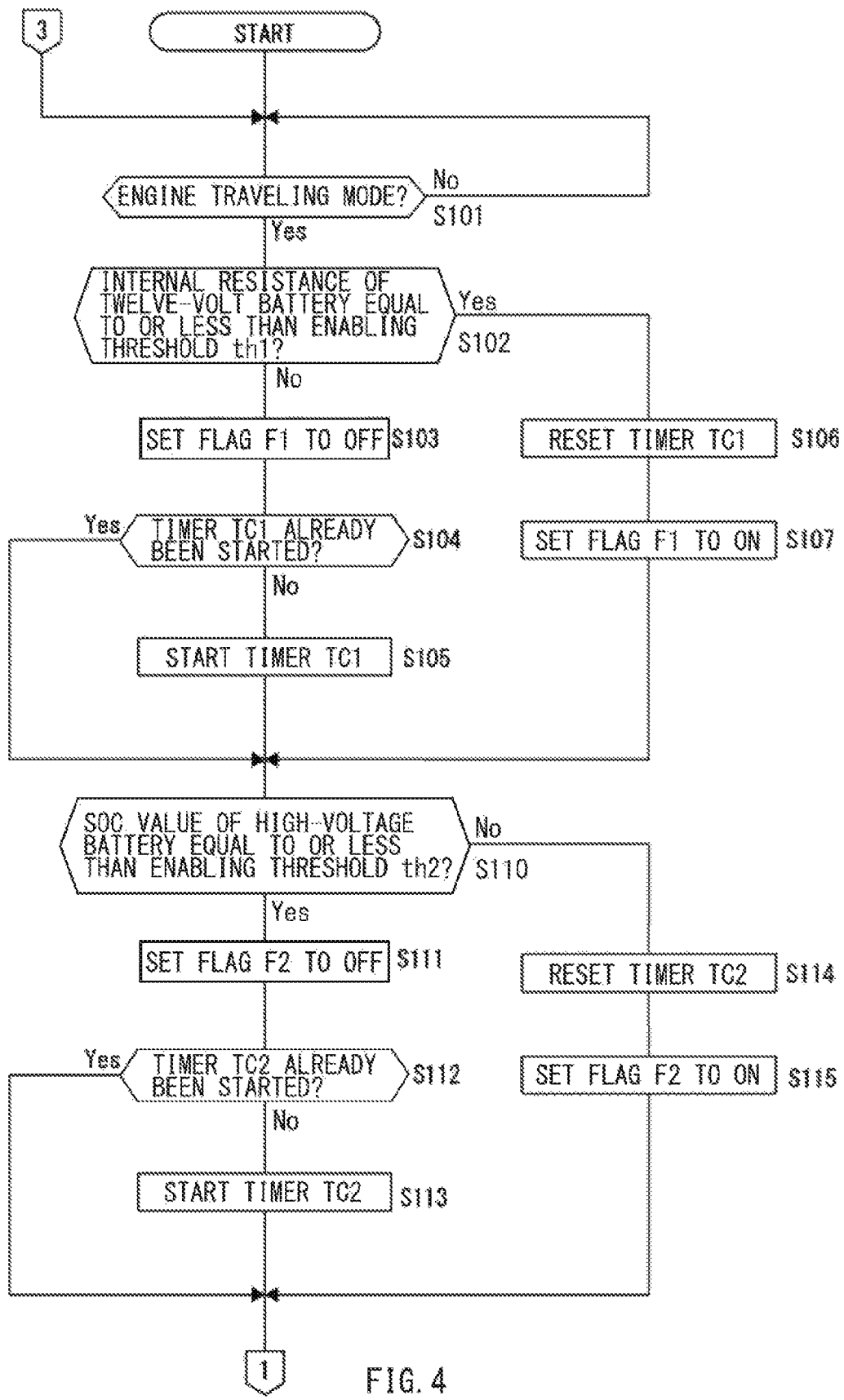
FIG. 4 is a flowchart illustrating an example of a process to be executed by the control unit according to one example embodiment.
Figure 5:
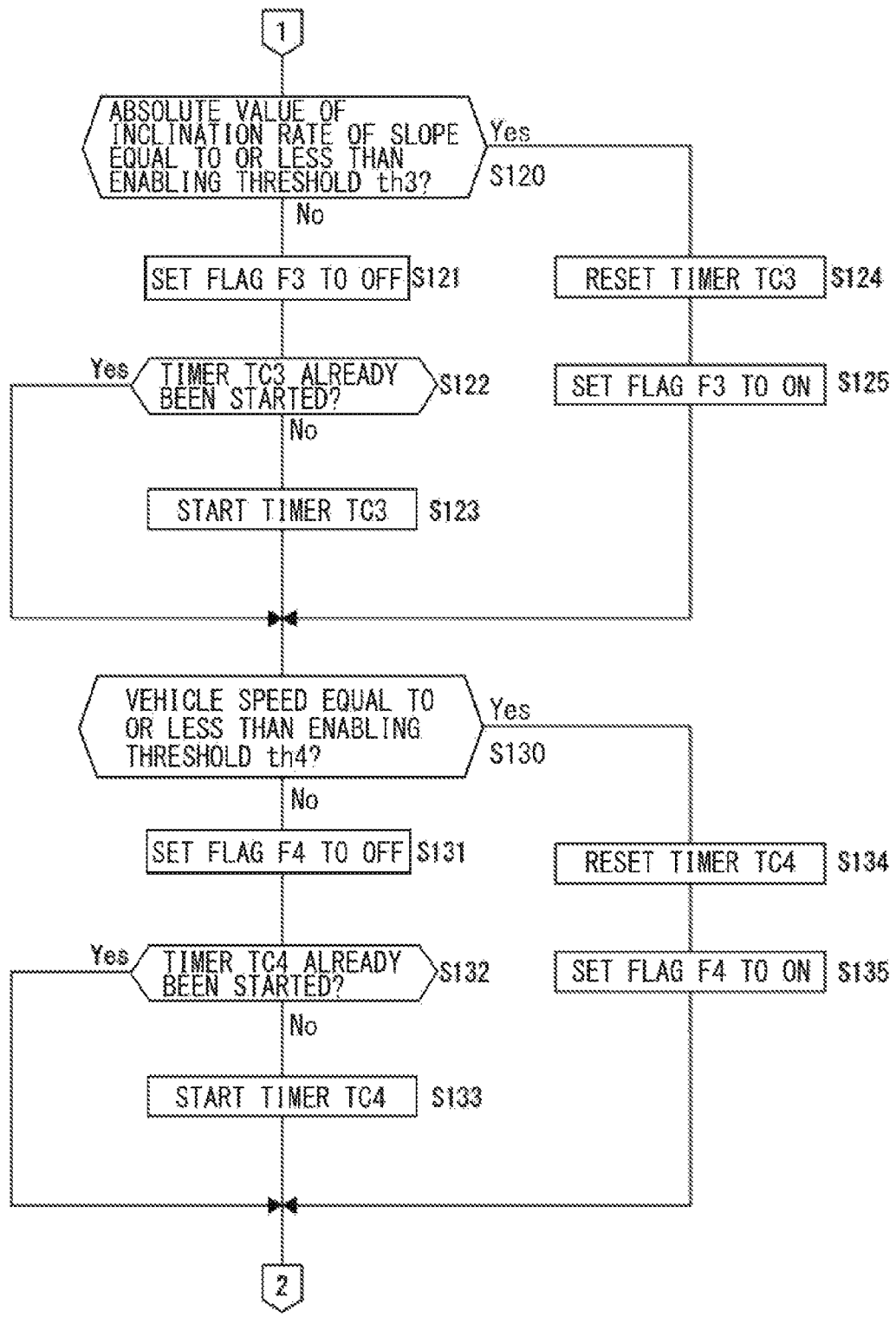
FIG. 5 is a flowchart illustrating an example of the process to be executed by the control unit according to one example embodiment.

Referring to FIG. 4, in step S101, the control unit 4 may determine whether the traveling mode of the vehicle is set to the engine traveling mode.

In a case where the traveling mode of the vehicle is not set to the engine traveling mode (No in step S101), the control unit 4 may repeat the process in step S101 until the traveling mode of the vehicle is set to the engine traveling mode. In a case where the traveling mode of the vehicle is set to the engine traveling mode (Yes in step S101), the control unit 4 may cause the process to proceed from step S101 to step S102 and to the subsequent steps.

In the engine traveling mode, in step S102, the control unit 4 may determine whether the enabling condition of the "internal resistance of the twelve-volt battery" is equal to or less than the enabling threshold th1.

In a case where the enabling condition of the "internal resistance of the twelve-volt battery" exceeds the enabling threshold th1, i.e., in a case where the control unit 4 determines that the enabling condition of the "internal resistance of the twelve-volt battery" is not satisfied (No in step S102), the control unit 4 may set the flag F1 to the OFF state in step S103. The control unit 4 may thus manage that the enabling condition of the "internal resistance of the twelve-volt battery" is determined as not being satisfied.

Thereafter, in step S104, the control unit 4 may determine whether a timer TC1 has started time count, and may change the subsequent process depending on a result of the determination.

In a case where the timer TC1 has not started the time count (No in step S104), the control unit 4 may cause the process to proceed to step S105. In step S105, the control unit 4 may cause the timer TC1 to start the time count, and may cause the process to proceed to step S110. The timer TC1 may measure a time length of a period during which the enabling condition of the "internal resistance of the twelve-volt battery" is determined as not being satisfied, i.e., a period during which the flag F1 is set to the OFF state.

In a case where the timer TC1 has already started the time count (Yes in step S104), the control unit 4 may cause the process to proceed from step S104 to step S110.

In a case where the internal resistance of the twelve-volt battery is determined as being equal to or less than the enabling threshold th1 in step S102 (Yes in step S102), the control unit 4 may cause the process to proceed to step S106. In step S106, the control unit 4 may reset the timer TC1. That is, in response to the satisfaction of the enabling condition of the "internal resistance of the twelve-volt battery", the control unit 4 may reset the measurement of the period during which the enabling condition of the "internal resistance of the twelve-volt battery" is determined as not being satisfied.

Thereafter, the control unit 4 may set the flag F1 to the ON state in step S107. The control unit 4 may thus manage that the enabling condition of the "internal resistance of the twelve-volt battery" is determined as being satisfied.

In a case where the process is caused to proceed to step S106 when the timer TC1 has already been reset, the control unit 4 may maintain the reset state of the timer TC1.

In this case, the flag F1 may have already been set to the ON state. Therefore, the control unit 4 may maintain the ON state of the flag F1 in step S107.

Following the process related to the enabling condition of the "internal resistance of the twelve-volt battery" described above, in step S110, the control unit 4 may determine whether the enabling condition of the "SOC value of the high-voltage battery" is equal to or less than the enabling threshold th2.

In a case where the enabling condition of the "SOC value of the high-voltage battery" is equal to or less than the enabling threshold th2, i.e., in a case where the control unit 4 determines that the enabling condition of the "SOC value of the high-voltage battery" is not satisfied (Yes in step S110), the control unit 4 may set the flag F2 to the OFF state in step S111. The control unit 4 may thus manage that the enabling condition of the "SOC value of the high-voltage battery" is determined as not being satisfied.

Thereafter, in step S112, the control unit 4 may determine whether a timer TC2 has started time count, and may change the subsequent process depending on a result of the determination.

In a case where the timer TC2 has not started the time count (No in step S112), the control unit 4 may cause the process to proceed to step S113. In step S113, the control unit 4 may cause the timer TC2 to start the time count, and may cause the process to proceed to step S120. The timer TC2 may measure a time length of a period during which the enabling condition of the "SOC value of the high-voltage battery" is determined as not being satisfied, i.e., a period during which the flag F2 is set to the OFF state.

In a case where the timer TC2 has already started the time count (Yes in step S112), the control unit 4 may cause the process to proceed from step S112 to step S120.

In a case where the SOC value of the high-voltage battery is determined as exceeding the enabling threshold th2 in step S110 (No in step S110), the control unit 4 may cause the process to proceed to step S114. In step S114, the control unit 4 may reset the timer TC2. That is, in response to the satisfaction of the enabling condition of the "SOC value of the high-voltage battery", the control unit 4 may reset the measurement of the period during which the enabling condition of the "SOC value of the high-voltage battery" is determined as not being satisfied.

Thereafter, the control unit 4 may set the flag F2 to the ON state in step S115. The control unit 4 may thus manage that the enabling condition of the "SOC value of the high-voltage battery" is determined as being satisfied.

In a case where the process is caused to proceed to step S114 when the timer TC2 has already been reset, the control unit 4 may maintain the reset state of the timer TC2.

In this case, the flag F2 may have already been set to the ON state. Therefore, the control unit 4 may maintain the ON state of the flag F2 in step S115.

Following the process related to the enabling condition of the "SOC value of the high-voltage battery" described above, in step S120 illustrated in FIG. 5, the control unit 4 may determine whether the absolute value of the enabling condition of the "inclination rate of the slope" is equal to or less than the enabling threshold th3.

In a case where the absolute value of the enabling condition of the "inclination rate of the slope" exceeds the enabling threshold th3, i.e., in a case where the control unit 4 determines that the absolute value of the enabling condition of the "inclination rate of the slope" is not satisfied (No in step S120), the control unit 4 may set the flag F3 to the OFF state in step S121. The control unit 4 may thus manage that the enabling condition of the "inclination rate of the slope" is determined as not being satisfied.

Thereafter, in step S122, the control unit 4 may determine whether a timer TC3 has started time count, and may change the subsequent process depending on a result of the determination.

In a case where the timer TC3 has not started the time count (No in step S122), the control unit 4 may cause the process to proceed to step S123. In step S123, the control unit 4 may cause the timer TC3 to start the time count, and may cause the process to proceed to step S130. The timer TC3 may measure a time length of a period during which the enabling condition of the "inclination rate of the slope" is determined as not being satisfied, i.e., a period during which the flag F3 is set to the OFF state.

In a case where the timer TC3 has already started the time count (Yes in step S122), the control unit 4 may cause the process to proceed from step S122 to step S130.

In a case where the absolute value of the inclination rate of the slope is determined as being equal to or less than the enabling threshold th3 in step S120 (Yes in step S120), the control unit 4 may cause the process to proceed to step S124. In step S124, the control unit 4 may reset the timer TC3. That is, in response to the satisfaction of the enabling condition of the "inclination rate of the slope", the control unit 4 may reset the measurement of the period during which the enabling condition of the "inclination rate of the slope" is determined as not being satisfied.

Thereafter, the control unit 4 may set the flag F3 to the ON state in step S125. The control unit 4 may thus manage that the enabling condition of the "inclination rate of the slope" is determined as being satisfied.

In a case where the process is caused to proceed to step S124 when the timer TC3 has already been reset, the control unit 4 may maintain the reset state of the timer TC3.

In this case, the flag F3 may have already been set to the ON state. Therefore, the control unit 4 may maintain the ON state of the flag F3 in step S125.

Following the process related to the enabling condition of the "inclination rate of the slope" described above, in step S130, the control unit 4 may determine whether the enabling condition of the "vehicle speed" is equal to or less than the enabling threshold th4.

In a case where the enabling condition of the "vehicle speed" exceeds the enabling threshold th4, i.e., in a case where the control unit 4 determines that the enabling condition of the "vehicle speed" is not satisfied (No in step S130), the control unit 4 may set the flag F4 to the OFF state in step S131. The control unit 4 may thus manage that the enabling condition of the "vehicle speed" is determined as not being satisfied.

Thereafter, in step S132, the control unit 4 may determine whether a timer TC4 has started time count, and may change the subsequent process depending on a result of the determination.

In a case where the timer TC4 has not started the time count (No in step S132), the control unit 4 may cause the process to proceed to step S133. In step S133, the control unit 4 may cause the timer TC4 to start the time count, and may cause the process to proceed to step S140 illustrated in FIG. 6. The timer TC4 may measure a time length of a period during which the enabling condition of the "vehicle speed" is determined as not being satisfied, i.e., a period during which the flag F4 is set to the OFF state.

Figure 6:
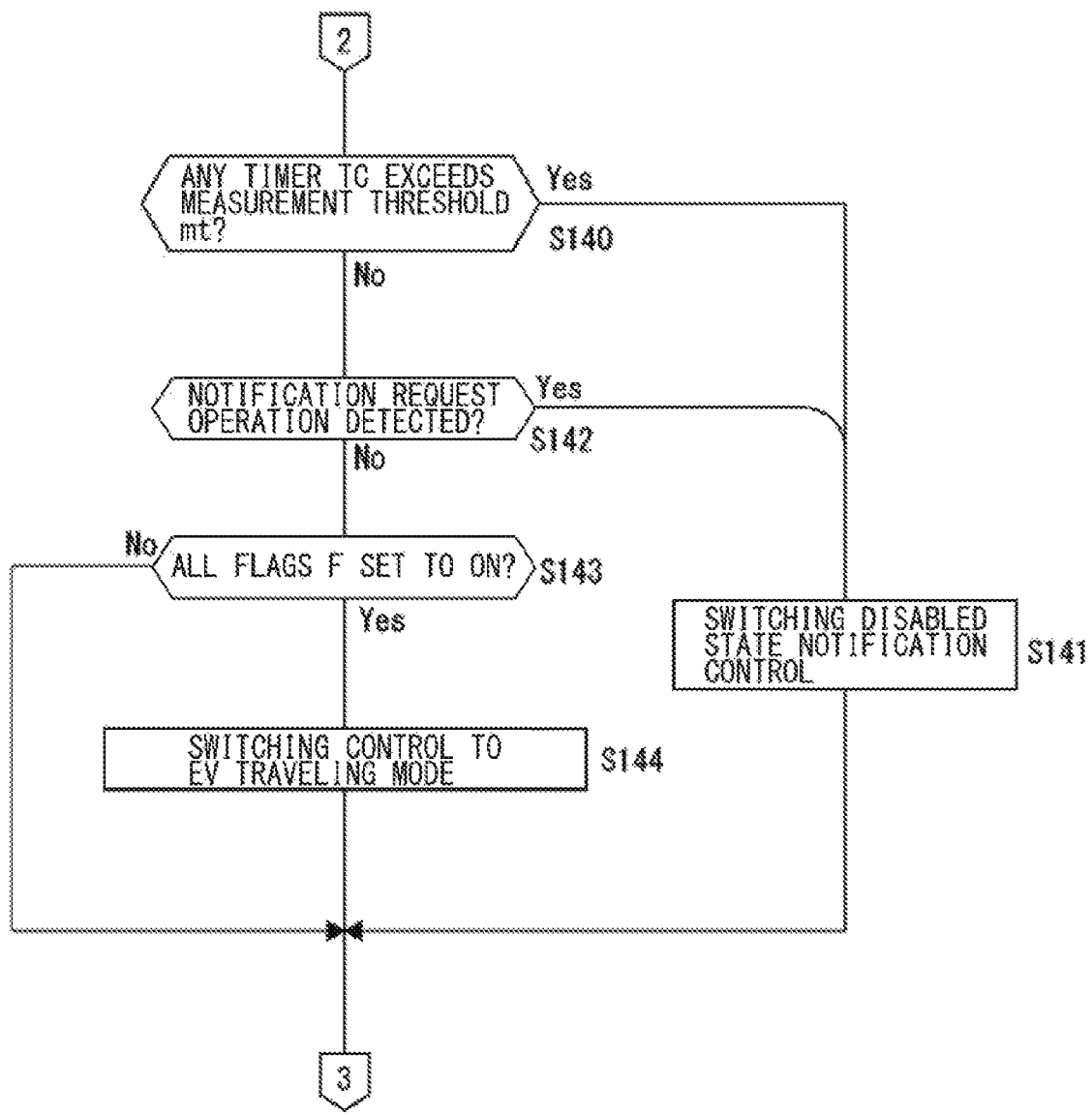
FIG. 6 is a flowchart illustrating an example of the process to be executed by the control unit according to one example embodiment.

In a case where the timer TC4 has already started the time count (Yes in step S132), the control unit 4 may cause the process to proceed from step S132 to step S140 illustrated in FIG. 6.

In a case where the vehicle speed is determined as being equal to or less than the enabling threshold th4 in step S130 (Yes in step S130), the control unit 4 may cause the process to proceed to step S134. In step S134, the control unit 4 may reset the timer TC4. That is, in response to the satisfaction of the enabling condition of the "vehicle speed", the control unit 4 may reset the measurement of the period during which the enabling condition of the "vehicle speed" is determined as not being satisfied.

Thereafter, the control unit 4 may set the flag F4 to the ON state in step S135. The control unit 4 may thus manage that the enabling condition of the "vehicle speed" is determined as being satisfied. Thereafter, the control unit 4 may cause the process to proceed to step S140 illustrated in FIG. 6.

In a case where the process is caused to proceed to step S134 when the timer TC4 has already been reset, the control unit 4 may maintain the reset state of the timer TC4.

In this case, the flag F4 may have already been set to the ON state. Therefore, the control unit 4 may maintain the ON state of the flag F4 in step S135.

Following the process related to the enabling condition of the "vehicle speed" described above, the control unit 4 may cause the process to proceed to step S140 illustrated in FIG. 6. In step S140, the control unit 4 may determine whether the measured time value of any of the timers TC (i.e., the timers TC1, TC2, TC3, and TC4) that is performing the time count exceeds the measurement threshold mt (i.e., corresponding one of the measurement thresholds mt1, mt2, mt3, and mt4) set for the corresponding enabling condition.

In a case where the measured time value of any of the timers TC exceeds the measurement threshold mt (Yes in step S140), in step S141, the control unit 4 may perform the control of making the notification that the switching control to the EV traveling mode is in the disabled state. On this occasion, the control unit 4 may display, for example, on the MFD 20, the enabling condition for which the measured time value of the timer TC exceeds the measurement threshold mt. Accordingly, the notification of the enabling condition that is not satisfied may not be made immediately upon unsatisfaction of the enabling condition, but may be made after a predetermined period elapses with the enabling condition being kept unsatisfied. Thereafter, the control unit 4 may cause the process to return to step S101 illustrated in FIG. 4.

In a case where none of the timers TC has started the time count in step S140 or in a case where all of the measured time values of the timers TC are equal to or less than respective measurement thresholds mt in step S140 (No in step S140), the control unit 4 may cause the process to proceed to step S142.

In step S142, the control unit 4 may determine whether the control unit 4 has detected notification request operation performed by the user. The notification request operation performed by the user may include, for example but not limited to, operation of pressing a button provided in the vehicle.

In a case where the control unit 4 has detected the notification request operation performed by the user (Yes in step S142), in step S141, the control unit 4 may perform the control of making notification regarding the enabling condition having the flag F in the OFF state, i.e., the enabling condition that is not satisfied. Thereby, in a case where the user requests the notification of the enabling condition that is not satisfied, the notification request operation performed by the user may be prioritized, and the notification of the enabling condition that is not satisfied may be made. In this case, the notification of the enabling condition that is not satisfied may be made even before the predetermined period set for the notification of the enabling condition that is not satisfied elapses, i.e., even if the measured time value of the enabling condition that is not satisfied does not exceed the measurement threshold mt.

After performing the process in step S141, the control unit 4 may cause the process to return to step S101 illustrated in FIG. 4. Note that, in one non-limiting example, the control unit 4 may not perform the process in step S142.

In a case where the control unit 4 has not detected the notification request operation in step S142 (No in step S142), the control unit 4 may cause the process to proceed to step S143. In step S143, the control unit 4 may determine whether all of the flags F (i.e., all of the flags F1 to F4) are in the ON state.

In a case where all of the flags F are in the ON state (Yes in step S143), the control unit 4 may determine that all of the enabling conditions are satisfied, and may cause the process to proceed to step S144. In step S144, the control unit 4 may perform the switching control from the engine traveling mode to the EV traveling mode. Thereafter, the control unit 4 may cause the process to return to step S101 illustrated in FIG. 4.

In a case where not all of the flags F are in the ON state in step S143 (No in step S143), i.e., in a case where any of the enabling conditions is not satisfied, the control unit 4 may cause the process to return from step S143 to step S101 illustrated in FIG. 4.

The control unit 4 may repeatedly execute the above-described processes while the vehicle is traveling. The first example embodiment may be achieved by the processes performed by the control unit 4 described above.

Note that the measurement threshold mt of each of the enabling conditions according to the first example embodiment may be variously set depending on various factors. For example, if the set measurement threshold mt is excessively small, the notification that the switching control to the EV traveling mode is in the disabled state is made every time the enabling condition is determined as no longer being satisfied. Such notification can be troublesome for the user present in the vehicle. Therefore, in one example embodiment, the measurement threshold mt may be set to have a certain length of time which is not considered to be excessively small.

In addition, in a situation where it is easy for the user present in the vehicle to assume that the switching control to the EV traveling mode is in the disabled state, frequent notification of that the switching control to the EV traveling mode is in the disabled state can also be troublesome for the user. Therefore, the measurement threshold mt may be set longer for the enabling condition for which it is assumed that the above-described situation may occur.

For example, in a case where the vehicle is traveling on an expressway, it is assumed that the vehicle travels at a high speed for a long period of time. Accordingly, it is assumable that the enabling condition of the "vehicle speed" will not be satisfied for a long period of time. For this reason, a greater measurement threshold mt, e.g., the measurement threshold t4 of "3600 seconds", may be set for the enabling condition of the "vehicle speed".

Regarding some of the enabling conditions, if the switching control to the EV traveling mode is kept in the disabled state even after a predetermined time elapses, malfunction of a device that detects the corresponding enabling condition may be assumable. In this case, a time for assuming the malfunction may be set as the measurement threshold mt.

For example, the enabling condition of the "internal resistance of the twelve-volt battery" typically becomes equal to or less than the enabling threshold th1 in about 4 seconds. Therefore, the measurement threshold mt1 may be set to "4 seconds". This allows to assume malfunction of the twelve-volt battery in a case where the internal resistance does not become equal to or lower than the enabling threshold th1 (i.e., the internal resistance is over the enabling threshold th1) even after "4 seconds" elapses.

4. Second Example Embodiment

A second example embodiment of the technology is described with reference to FIGS. 7 to 9. The second example embodiment is an example in which the measurement start timing st of the measurement of the measured time value is set to a timing when the number of the enabling condition remaining as not being satisfied becomes one.

Figure 7:
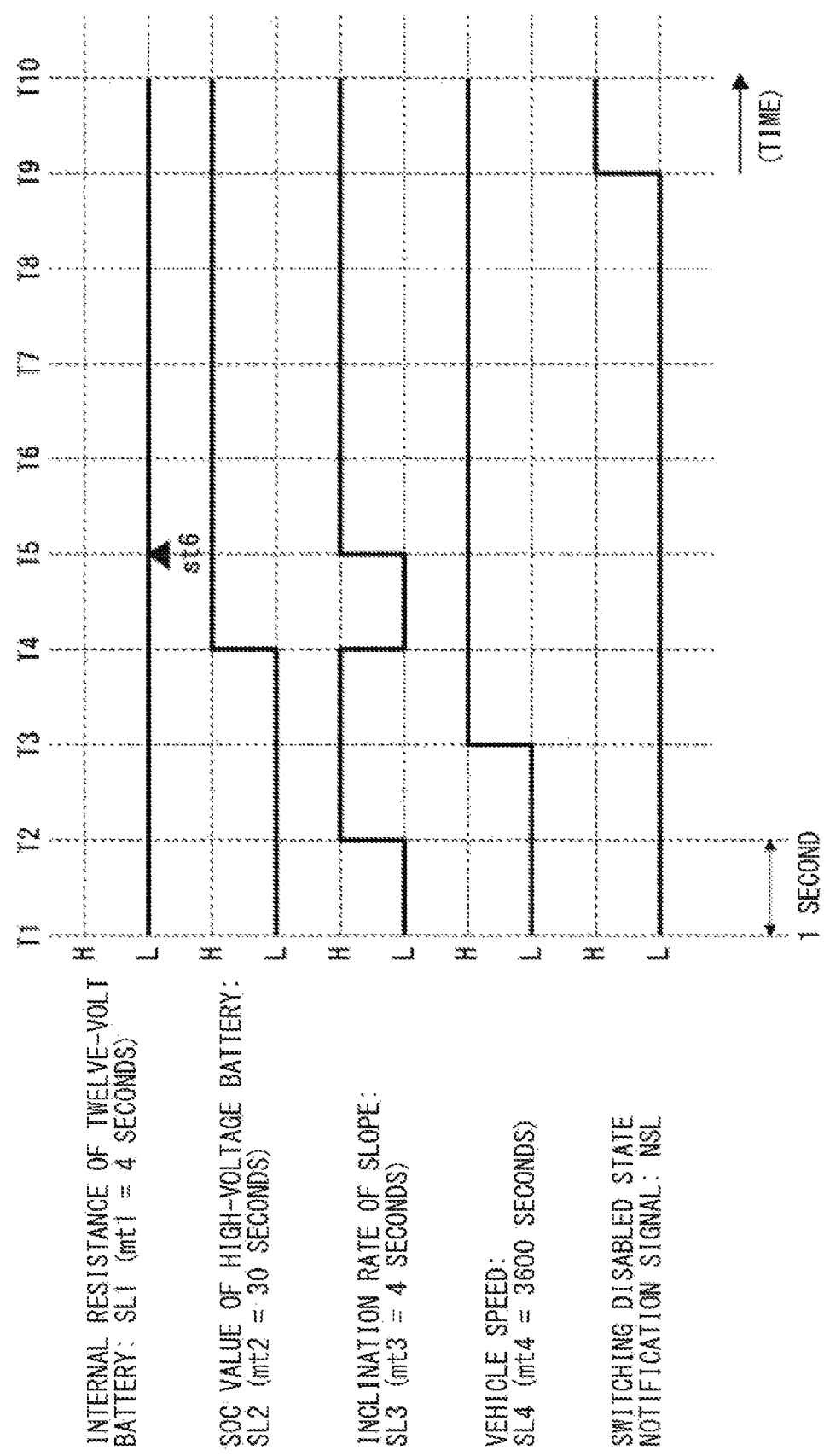
FIG. 7 is a timing chart illustrating an example of a control of making notification that the switching control is in the disabled state according to one example embodiment.

FIG. 7 illustrates transition between the state where each of the enabling condition is satisfied and the state where each of the enabling condition is not satisfied, as with FIG. 3. The example illustrated in FIG. 7 is similar to the example illustrated in FIG. 3 in a period from the timing T1 to the timing T5.

At the timing T5 in FIG. 7, the waveform SL1 is at the L-level, and the other waveforms SL2, SL3, and SL4 are all at the H-level. In other words, only one of the enabling conditions is not satisfied. At such a timing when the number of the enabling condition remaining as not being satisfied becomes one, the measurement of the measured time value may be started for the single enabling condition remaining as not being satisfied.

Therefore, the timing T5 may be set as the measurement start timing st6 for the measured time value of the enabling condition of the "internal resistance of the twelve-volt battery".

At a timing T9, the enabling condition of the "internal resistance of the twelve-volt battery" is not satisfied, as indicated by the waveform SL1. The measured time value of the enabling condition of the "internal resistance of the twelve-volt battery" reaches the measurement threshold mt1 (e.g., 4 seconds) at the timing T9. Therefore, the timing T9 may be the timing to make the notification that the switching control to the EV traveling mode is in the disabled state, as indicated by the waveform NSL. Accordingly, the control unit 4 may perform the control of making the notification that the switching control to the EV traveling mode is in the disabled state.

That is, according to the second example embodiment, the control unit 4 may perform, at the timing when the number of the enabling condition remaining as not being satisfied becomes one (i.e., at the measurement start timing st6), the measurement of the measured time value of the enabling condition remaining as not being satisfied. Further, the control unit 4 may perform the control of making the notification that the switching control to the EV traveling mode is in the disabled state when the measured time value exceeds the measurement threshold mt set for the enabling condition remaining as not being satisfied.

An example of a process for the control unit 4 to execute the above-described control is described below with reference to FIGS. 8 and 9.

Figure 8:
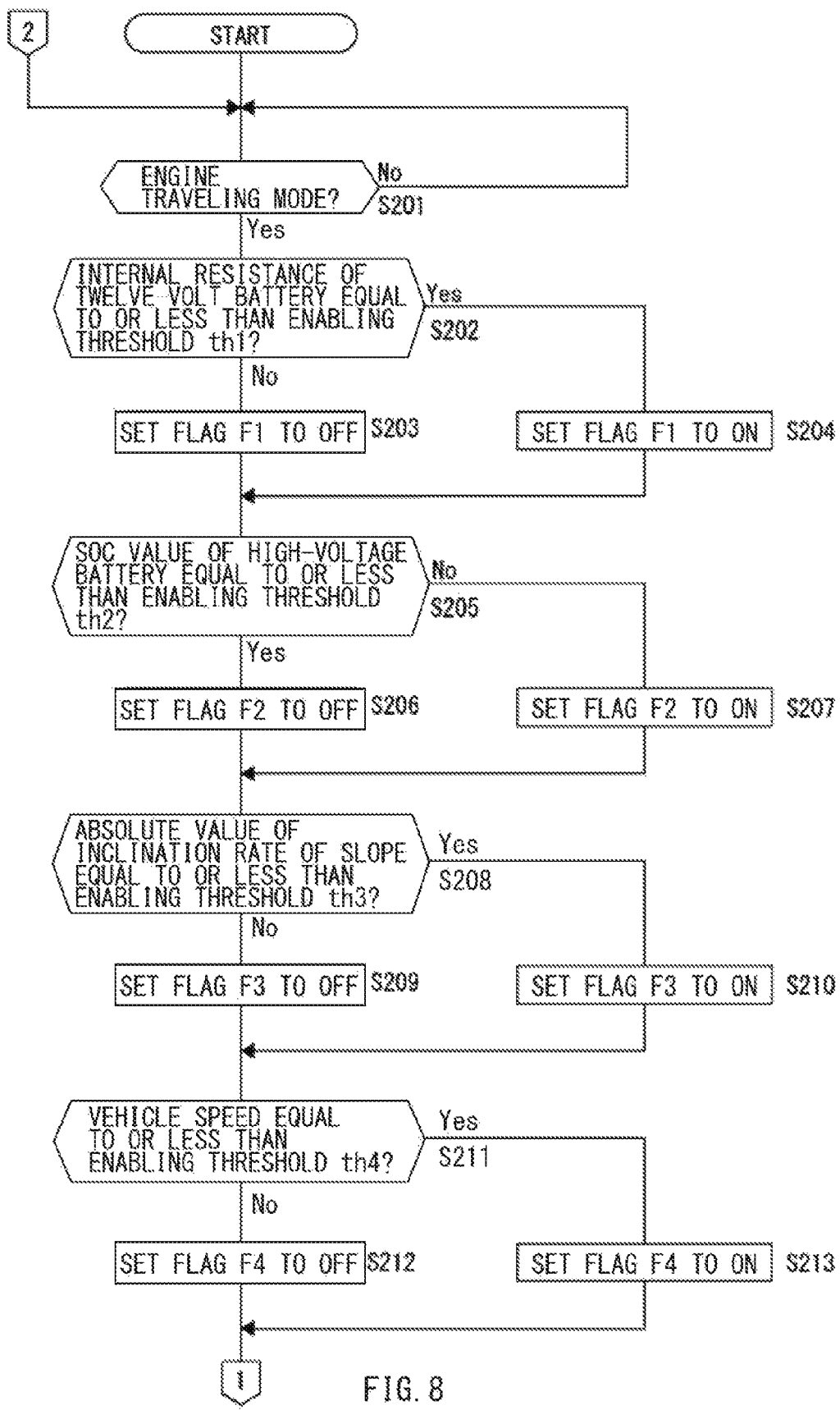
FIG. 8 is a flowchart illustrating an example of a process to be executed by the control unit according to one example embodiment.
Figure 9:
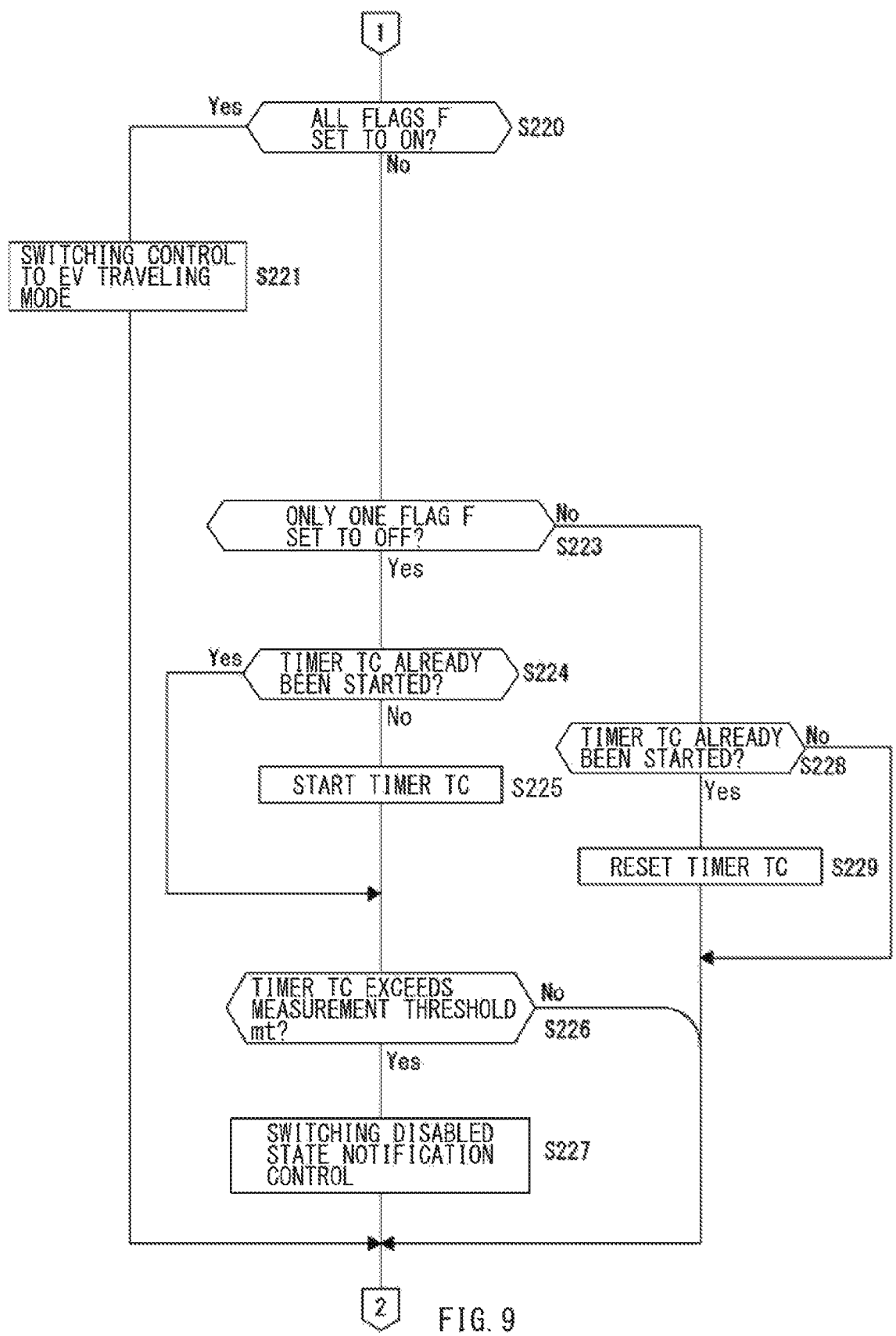
FIG. 9 is a flowchart illustrating an example of the process to be executed by the control unit according to the one example embodiment.

Referring to FIG. 8, in step S201, the control unit 4 may determine whether the traveling mode of the vehicle is set to the engine traveling mode.

In a case where the traveling mode of the vehicle is not set to the engine traveling mode (No in step S201), the control unit 4 may repeat the process in step S201 until the traveling mode of the vehicle is set to the engine traveling mode. In a case where the traveling mode of the vehicle is set to the engine traveling mode (Yes in step S201), the control unit 4 may cause the process to proceed from step S201 to step S202 and to the subsequent steps.

In the engine traveling mode, in step S202, the control unit 4 may determine whether the enabling condition of the "internal resistance of the twelve-volt battery" is equal to or less than the enabling threshold th1.

In a case where the enabling condition of the "internal resistance of the twelve-volt battery" exceeds the enabling threshold th1, i.e., in a case where the control unit 4 determines that the enabling condition of the "internal resistance of the twelve-volt battery" is not satisfied (No in step S202), the control unit 4 may set the flag F1 to the OFF state in step S203. The control unit 4 may thus manage that the enabling condition of the "internal resistance of the twelve-volt battery" is determined as not being satisfied. Thereafter, the control unit 4 may cause the process to proceed from step S203 to step S205.

In a case where the enabling condition of the "internal resistance of the twelve-volt battery" is equal to or less than the enabling threshold th1, i.e., in a case where the control unit 4 determines that the enabling condition of the "internal resistance of the twelve-volt battery" is satisfied in step S202 (Yes in step S202), the control unit 4 may cause the process to proceed to step S204. In step S204, the control unit 4 may set the flag F1 to the ON state.

In a case where the flag F1 has already been set to the ON state, the control unit 4 may maintain the ON state of the flag F1 in step S204.

Following the process related to the enabling condition of the "internal resistance of the twelve-volt battery" described above, in step S205, the control unit 4 may determine whether the enabling condition of the "SOC value of the high-voltage battery" is equal to or less than the enabling threshold th2.

In a case where the enabling condition of the "SOC value of the high-voltage battery" is equal to or less than the enabling threshold th2, i.e., in a case where the control unit 4 determines that the enabling condition of the "SOC value of the high-voltage battery" is not satisfied (Yes in step S205), the control unit 4 may set the flag F2 to the OFF state in step S206. The control unit 4 may thus manage that the enabling condition of the "SOC value of the high-voltage battery" is determined as not being satisfied. Thereafter, the control unit 4 may cause the process to proceed from step S206 to step S208.

In a case where the enabling condition of the "SOC value of the high-voltage battery" exceeds the enabling threshold th2, i.e., in a case where the control unit 4 determines that the enabling condition of the "SOC value of the high-voltage battery" is satisfied in step S205 (No in step S205), the control unit 4 may cause the process to proceed to step S207. In step S207, the control unit 4 may set the flag F2 to the ON state.

In a case where the flag F2 has already been set to the ON state, the control unit 4 may maintain the ON state of the flag F2 in step S207.

Following the process related to the enabling condition of the "SOC value of the high-voltage battery" described above, in step S208, the control unit 4 may determine whether the absolute value of the enabling condition of the "inclination rate of the slope" is equal to or less than the enabling threshold th3.

In a case where the absolute value of the enabling condition of the "inclination rate of the slope" exceeds the enabling threshold th3, i.e., in a case where the control unit 4 determines that the enabling condition of the "inclination rate of the slope" is not satisfied (No in step S208), the control unit 4 may set the flag F3 to the OFF state in step S209. The control unit 4 may thus manage that the enabling condition of the "inclination rate of the slope" is determined as not being satisfied. Thereafter, the control unit 4 may cause the process to proceed from step S209 to step S211.

In a case where the absolute value of the enabling condition of the "inclination rate of the slope" is equal to or less than the enabling threshold th3, i.e., in a case where the control unit 4 determines that the enabling condition of the "inclination rate of the slope" is satisfied in step S208 (Yes in step S208), the control unit 4 may cause the process to proceed to step S210. In step S210, the control unit 4 may set the flag F3 to the ON state.

In a case where the flag F3 has already been set to the ON state, the control unit 4 may maintain the ON state of the flag F3 in step S210.

Following the process related to the enabling condition of the "inclination rate of the slope" described above, in step S211, the control unit 4 may determine whether the enabling condition of the "vehicle speed" is equal to or less than the enabling threshold th4.

In a case where the enabling condition of the "vehicle speed" exceeds the enabling threshold th4, i.e., in a case where the control unit 4 determines that the enabling condition of the "vehicle speed" is not satisfied (No in step S211), the control unit 4 may set the flag F4 to the OFF state in step S212. The control unit 4 may thus manage that the enabling condition of the "vehicle speed" is determined as not being satisfied. Thereafter, the control unit 4 may cause the process to proceed from step S212 to step S220 illustrated in FIG. 9.

In a case where the enabling condition of the "vehicle speed" is determined as being equal to or less than the enabling threshold th4, i.e., in a case where the control unit 4 determines that the enabling condition of the "vehicle speed" is satisfied in step S211 (Yes in step S211), the control unit 4 may cause the process to proceed to step S213. In step S213, the control unit 4 may set the flag F4 to the ON state.

In a case where the flag F4 has already been set to the ON state, the control unit 4 may maintain the ON state of the flag F4 in step S213.

Following the process related to the enabling condition of the "vehicle speed" described above, in step S220, the control unit 4 may determine whether all of the flags F (i.e., all of the flags F1 to F4) are in the ON state, i.e., whether all of the enabling conditions are satisfied.

In a case where all of the flags F are in the ON state (Yes in step S220), the control unit 4 may determine that all of the enabling conditions are satisfied, and may cause the process to proceed to step S221. In step S221, the control unit 4 may perform the switching control from the engine traveling mode to the EV traveling mode. Thereafter, the control unit 4 may cause the process to return to step S201 illustrated in FIG. 8.

In a case where not all of the flags F are in the ON state in step S220, i.e., in a case where any of the enabling conditions is not satisfied (No in step S220), the control unit 4 may cause the process to proceed from step S220 to step S223.

In step S223, the control unit 4 may determine whether the number of the enabling condition having the flag F in the OFF state is only one. In a case where the number of the enabling condition having the flag F in the OFF state is only one (Yes in step S223), the control unit 4 may cause the process to proceed to step S224. In step S224, the control unit 4 may determine whether the timer TC for the enabling condition having the flag F in the OFF state has started the time count, and may change the subsequent process depending on a result of the determination.

In a case where the timer TC has not started the time count (No in step S224), the control unit 4 may cause the process to proceed to step S225. In step S225, the control unit 4 may cause the timer TC to start the time count, and may cause the process to proceed to step S226. The timer TC may measure a time length of a period during which the single enabling condition remains as not being satisfied, i.e., a period during which the flag F of the single enabling condition remains being set to the OFF state.

In a case where the timer TC has already started the time count (Yes in step S224), the control unit 4 may cause the process to proceed from step S224 to step S226.

In step S226, the control unit 4 may determine whether the measured time value of the timer TC that is performing the time count exceeds the measurement threshold mt set for the corresponding enabling condition.

In a case where the measured time value of the timer TC exceeds the measurement threshold mt (Yes in step S226), in step S227, the control unit 4 may perform the control of making the notification that the switching control to the EV traveling mode is in the disabled state. Thereafter, the control unit 4 may cause the process to return to step S201 illustrated in FIG. 8.

In a case where the measured time value of the timer TC is equal to or less than the measurement threshold mt (No in step S226), the control unit 4 may cause the process to return to step S201 illustrated in FIG. 8 and may cause the timer TC to continue the time count.

In a case where the number of the enabling condition having the flag F in the OFF state is not only one, i.e., in a case where the number of the enabling condition having the flag F in the OFF state is two or more (No in step S223), the control unit 4 may cause the process to proceed to step S228.

In step S228, the control unit 4 may determine whether the timer TC for any of the enabling conditions having the respective flags F in the OFF state has started the time count, and may change the subsequent process depending on a result of the determination.

In a case where the timer TC for any of the enabling conditions having the respective flags F in the OFF state has already started the time count (Yes in step S228), the control unit 4 may cause the process to proceed from step S228 to step S229. In step S229, the control unit 4 may reset the timer TC. That is, in response to the unsatisfaction of the two or more enabling conditions, the control unit 4 may reset the measurement of the period during which the enabling conditions are determined as not being satisfied.

In a case where the process is caused to proceed to step S229 when the timers TC for all of the enabling conditions have already been reset, the control unit 4 may maintain the reset state of the timers TC.

After the processes described above, the control unit 4 may cause the process to return to step S201 illustrated in FIG. 8, and may repeatedly execute the processes in a similar manner while the vehicle is traveling. The second example embodiment may be achieved by the processes performed by the control unit 4 described above.

5. Third Example Embodiment

A third example embodiment of the technology is described. The third example embodiment is an example in which the measurement threshold mt1 of the enabling condition of the "internal resistance of the twelve-volt battery" may be set in accordance with a temperature of the twelve-volt battery.

This may be useful, for example, in a case where the measurement threshold mt is so set that malfunction of the twelve-volt battery is assumable from that the time during which the enabling condition of the "internal resistance of the twelve-volt battery" is determined as not being satisfied exceeds the measurement threshold mt.

In a case where the temperature of the twelve-volt battery is low, it sometimes takes a longer time for the internal resistance of the twelve-volt battery to become equal to or less than the enabling threshold th1 even if the twelve-volt battery is not malfunctioning, compared with a case where the temperature of the twelve-volt battery is at a normal temperature. For this reason, varying the measurement threshold mt1 in accordance with the temperature of the twelve-volt battery allows for measurement taking into consideration a state of the twelve-volt battery.

According to the third example embodiment, a variation threshold N1 may be set for the value of the temperature of the twelve-volt battery. In a case where the temperature of the twelve-volt battery is lower than the variation threshold N1, the control unit 4 may switch the measurement threshold mt1 from a first value to a second value that is greater than the first value.

Figure 10:
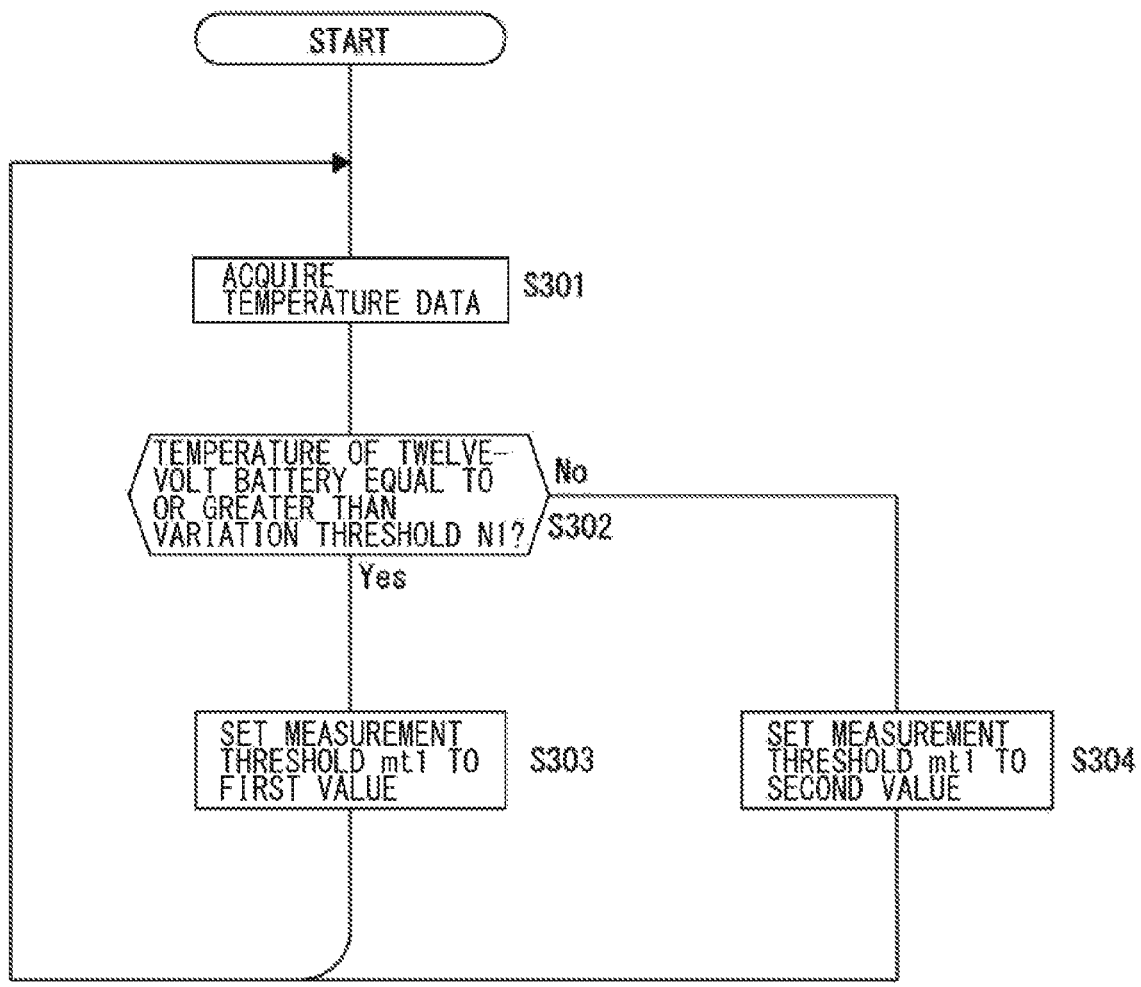
FIG. 10 is a flowchart illustrating an example of a process to be executed by the control unit according to one example embodiment.

A process to be executed by the control unit 4 according to the third example embodiment is described with reference to FIG. 10.

In step S301, the control unit 4 may first acquire temperature data, i.e., data regarding the temperature of the twelve-volt battery, from the temperature sensor 30 illustrated in FIG. 1. Thereafter, in step S302, the control unit 4 may determine whether the temperature of the twelve-volt battery is equal to or greater than the variation threshold N1 on the basis of the acquired temperature data.

In a case where the temperature of the twelve-volt battery is equal to or greater than the variation threshold N1 (Yes in step S302), the control unit 4 may set the measurement threshold mt1 to the first value in step S303, and may cause the process to return to step S301.

In a case where the temperature of the twelve-volt battery is less than the variation threshold N1 (No in step S302), the control unit 4 may switch the measurement threshold mt1 from the first value to the second value that is greater than the first value in the step S304. Thereafter, the control unit 4 may cause the process to return to step S301.

The control unit 4 may repeatedly execute the process described above, thereby varying the measurement threshold mt1 in accordance with the temperature of the twelve-volt battery. The measurement threshold mt1 thus set may be used in step S140 illustrated in FIG. 6 or in step S226 illustrated in FIG. 9.

6. Fourth Example Embodiment

A fourth example embodiment of the technology is described. The fourth example embodiment is an example in which the measurement threshold mt4 of the enabling condition of the "vehicle speed" may be set in accordance with the vehicle speed of the vehicle in which the user is present.

For example, in a case where the vehicle is traveling on an expressway, it is assumed that the vehicle travels maintaining a high speed for a long period of time. In such a case, it is assumable that the switching control to the EV traveling mode is kept in the disabled state for a long period of time.

In such a situation, it is easy for the user who is driving the vehicle to assume that the switching control to the EV traveling mode is in the disabled state. Therefore, notification of that the switching control to the EV traveling mode is in the disabled state at an excessively short cycle can also be troublesome for the user.

To address this, a vehicle speed which the vehicle is assumed to travel when the vehicle is traveling on a road such as the expressway may be set as a variation threshold N2. In a case where the enabling condition of the "vehicle speed" is equal to or greater than the variation threshold N2, the control unit 4 may set the measurement threshold mt4 to a second value that is greater than a first value.

Figure 11:
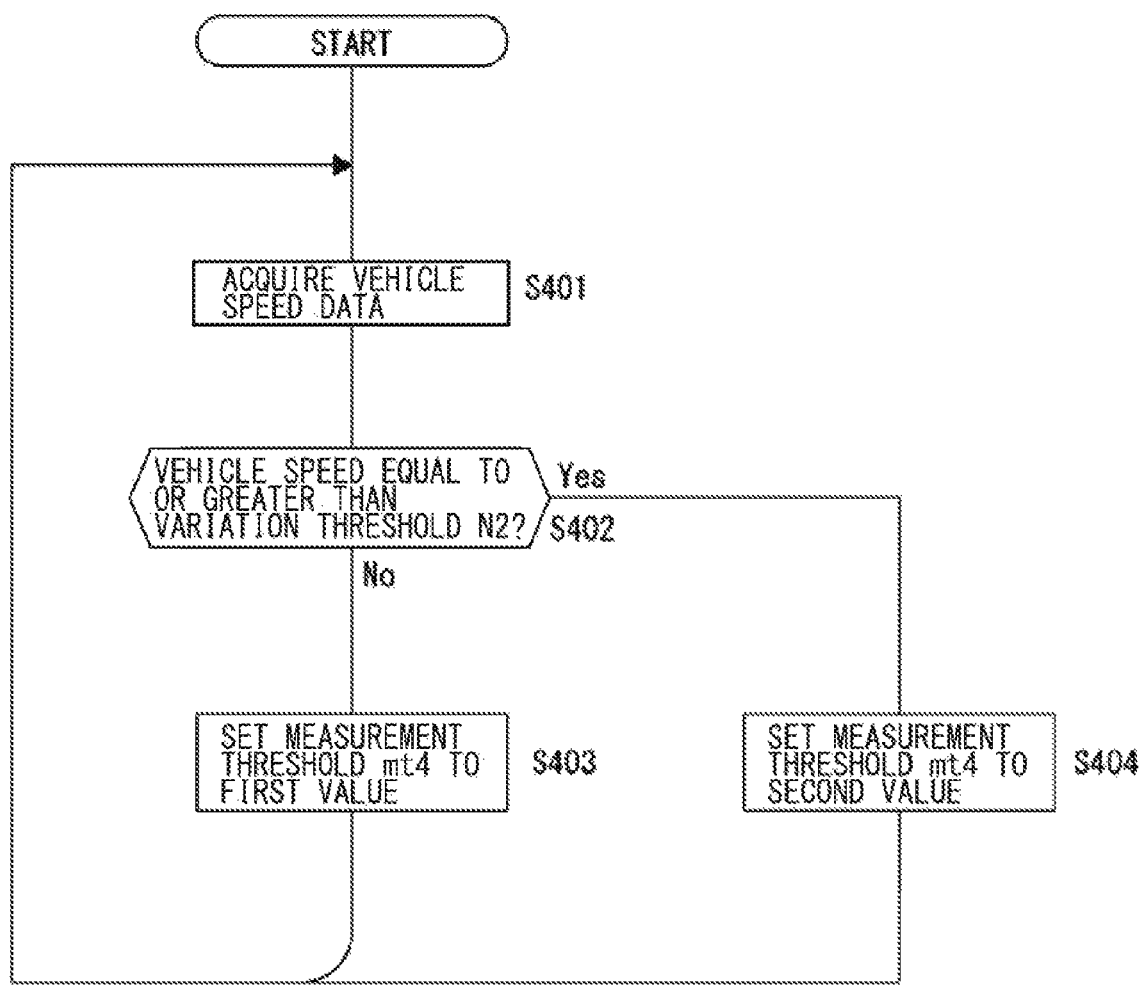
FIG. 11 is a flowchart illustrating an example of a process to be executed by the control unit according to one example embodiment.

A process to be executed by the control unit 4 according to the fourth example embodiment is described with reference to FIG. 11.

In step S401, the control unit 4 may first acquire vehicle speed data from the engine control unit 2. Thereafter, in step S402, the control unit 4 may determine whether the vehicle speed of the vehicle in a driving state is equal to or greater than the variation threshold N2 on the basis of the acquired vehicle speed data.

In a case where the vehicle speed is less than the variation threshold N2 (No in step S402), the control unit 4 may set the measurement threshold mt4 to the first value in step S403, and may cause the process to return to step S401.

In a case where the vehicle speed is equal to or greater than the variation threshold N2 (Yes in step S402), the control unit 4 may set the measurement threshold mt4 to the second value that is greater than the first value in the step S404. Thereafter, the control unit 4 may cause the process to return to step S401.

The control unit 4 may repeatedly execute the process described above, thereby varying the measurement threshold mt4 in accordance with the vehicle speed of the vehicle in which the user is present. The measurement threshold mt4 thus set may be used in step S140 illustrated in FIG. 6 or in step S226 illustrated in FIG. 9.

7. Fifth Example Embodiment

A fifth example embodiment of the technology is described. The fifth example embodiment is an example in which the measurement threshold mt4 of the enabling condition of the "vehicle speed" may be set in accordance with a traveling environment, i.e., an environment in which the vehicle with the user is traveling.

For example, in a case where the vehicle is traveling on the expressway, it is assumed that the vehicle travels maintaining a high vehicle speed for a long period of time. In such a case, it is assumable that the switching control to the EV traveling mode is kept in the disabled state for a long period of time. Accordingly, in a case where the control unit 4 determines that the traveling environment is the expressway, the control unit 4 may set the measurement threshold mt4 to a second value that is greater than a first value.

Figure 12:
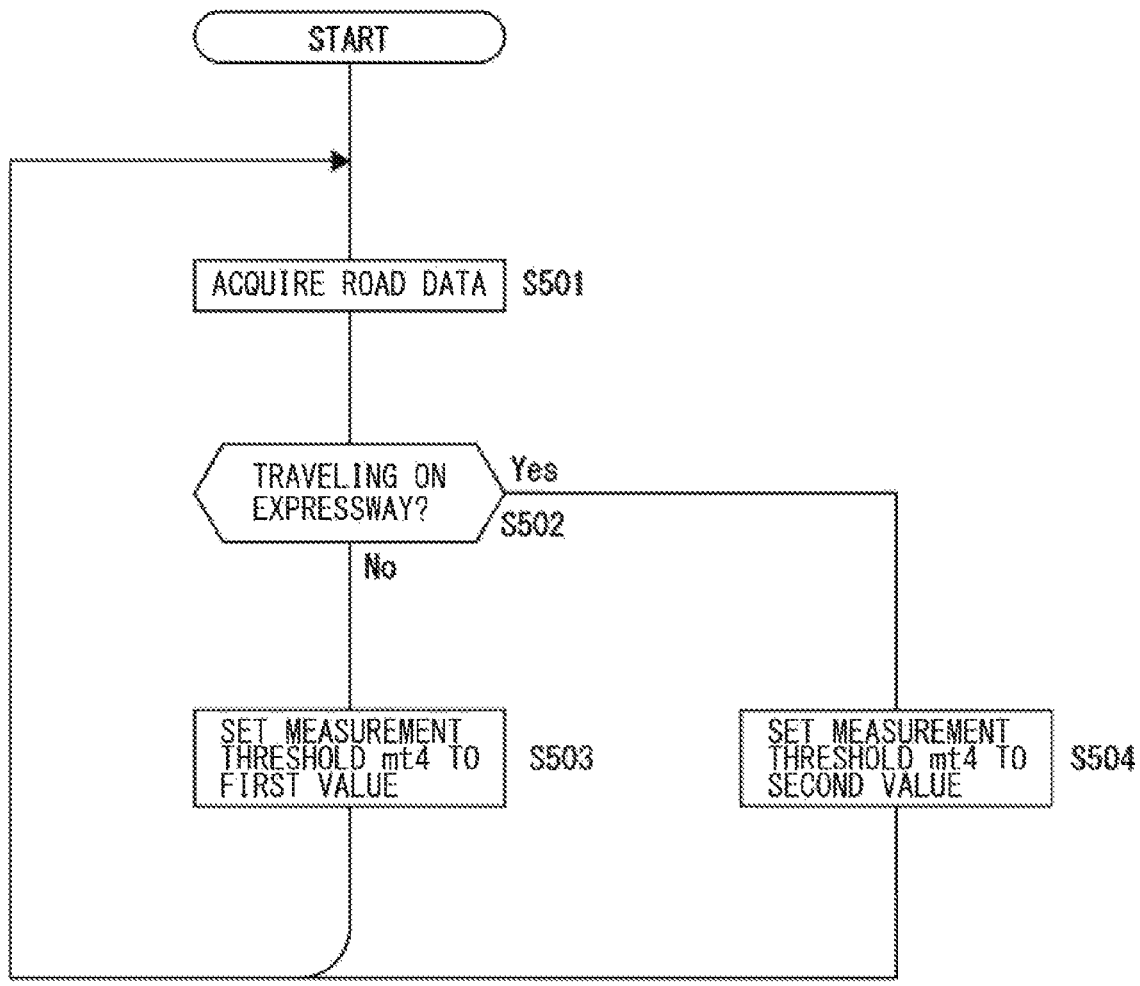
FIG. 12 is a flowchart illustrating an example of a process to be executed by the control unit according to one example embodiment.

A process to be executed by the control unit 4 according to the fifth example embodiment is described with reference to FIG. 12.

In step S501, the control unit 4 may first acquire road data from the navigation system 50. Thereafter, in step S502, the control unit 4 may determine whether the vehicle in the driving state is traveling on the expressway on the basis of the acquired road data.

In a case where the control unit 4 determines that the vehicle is not traveling on the expressway (No in step S502), the control unit 4 may set the measurement threshold mt4 to the first value in step S503, and may cause the process to return to step S501.

In a case where the control unit 4 determines that the vehicle is traveling on the expressway (Yes in step S502), the control unit 4 may set the measurement threshold mt4 to the second value that is greater than the first value in the step S504. Thereafter, the control unit 4 may cause the process to return to step S501.

The control unit 4 may repeatedly execute the process described above, thereby varying the measurement threshold mt4 in accordance with the traveling environment. The measurement threshold mt4 thus set may be used in step S140 illustrated in FIG. 6 or in step S226 illustrated in FIG. 9.

Note that examples of the traveling environment of the vehicle may include various environments other than the expressway. For example, data regarding an inclination of the vehicle may be acquired, or data of a road such as a mountain road may be acquired from the navigation system 50. This may allow the measurement threshold mt3 of the enabling condition of the "inclination rate of the slope" to be varied in accordance with an outside environment in which the vehicle is traveling.

Moreover, according to the fifth example embodiment, the measurement threshold mt may be set at two levels, i.e., the first value and the second value, as an example; however, this is non-limiting. In one example embodiment, the measurement threshold mt may be set at three or more levels in accordance with each of the enabling conditions.

Moreover, the fifth example embodiment has been described referring to an example in which the control unit 4 sets the measurement threshold mt in accordance with the traveling environment of the vehicle; however, this is non-limiting. In one example embodiment, the control unit 4 may vary the enabling threshold th in accordance with the traveling environment of the vehicle.

For example, the control unit 4 may determine whether a road on which the vehicle is traveling is an upward slope or a downward slope on the basis of acquired data regarding the traveling environment such as the inclination of the vehicle. The control unit 4 may vary the enabling threshold th3 of the enabling condition of the "inclination ratio of the slope" in accordance with a result of the determination. In this example, the enabling threshold th3 may be set not as the absolute value but as a value of the inclination rate of the upward or the downward slope.

In a case where the control unit 4 determines that the road on which the vehicle is traveling is the upward slope, the control unit 4 may set the enabling threshold th3 to 10%. In a case where the inclination rate of the slope is equal to or greater than 10%, the control unit 4 may determine that the enabling condition of the "inclination rate of the slope" is not satisfied. In a case where the inclination rate of the slope is less than 10%, the control unit 4 may determine that the enabling condition of the "inclination rate of the slope" is satisfied.

In a case where the control unit 4 determines that the road on which the vehicle is traveling is the downward slope, the control unit 4 may set the enabling threshold th3 to −5%. In a case where the inclination rate of the slope is less than −5%, the control unit 4 may determine that the enabling condition of the "inclination rate of the slope" is not satisfied. In a case where the inclination rate of the slope is equal to or greater than −5%, the control unit 4 may determine that the enabling condition of the "inclination rate of the slope" is satisfied.

8. Summary and Modifications

The vehicle control apparatus according to any of the example embodiments includes the condition determining unit 51, the mode switching controller 52, and the notification controller 53. The condition determining unit 51 may determine whether the two or more enabling conditions are satisfied. The enabling conditions may be set to enable the switching control to the EV traveling mode. The switching control to the EV traveling mode may be a control of performing switching to the EV traveling mode. The EV traveling mode may be a mode that causes the vehicle to travel with use of power from the rotating electrical device while the engine is stopped. The mode switching controller 52 may perform the switching control to the EV traveling mode in response to that the condition determining unit 51 determines that the enabling conditions are satisfied. The notification controller 53 may compare the measured time value and the measurement threshold mt with each other that are both related to the enabling condition, of the two or more enabling conditions, which the condition determining unit 51 determines as not being satisfied. The notification controller 53 may perform, in response to that the measured time value exceeds the measurement threshold mt, the control of making the notification that the switching control to the EV traveling mode is in the disabled state. For example, see FIGS. 2 and 4 to 6.

With this configuration, the notification that the switching control to EV traveling mode is in the disabled state is not made immediately after any of the enabling conditions becomes unsatisfied but is made after a period exceeding the measurement threshold mt elapses. This makes it possible to notify, at an appropriate timing, the user that the switching control to the EV traveling mode is in the disabled state. That is, the notification is made not every time when the switching control to the EV traveling mode is brought to the disabled state. This prevents frequent notification that can be troublesome for the user, providing the user with a comfortable driving environment.

In the vehicle control apparatus according to any of the example embodiments, the notification controller 53 may perform, in response to that the measured time value exceeds the measurement threshold mt, the control of making the notification of the enabling condition that is determined as not being satisfied. For example, see step S141 in FIG. 6.

With this configuration, the user is allowed to confirm which of the enabling conditions is the cause that has brought the switching control to the EV traveling mode to the disabled state. This is useful, for example, to identify a cause of malfunction of the vehicle in a case where the malfunction of the vehicle is preventing the switching control to the EV traveling mode.

In the vehicle control apparatus according to any of the example embodiments, the measurement threshold mt may be set, for each of the enabling conditions, as a time, in which the switching control to the EV traveling mode is in the disabled state, for assuming the malfunction of the device that detects the corresponding enabling condition. For example, see FIG. 3.

In one example, the measurement threshold mt that prevents the notification from being troublesome for the user may be set for each of the enabling conditions. In another example, the measurement threshold mt may be set in accordance with a period during which the switching control to the EV traveling mode is kept in the disabled state, which is assumed for each of the enabling conditions. In still another example, a period of time, elapse of which leads to assumption of abnormality of each of the enabling conditions, may be set as the measurement threshold mt.

This allows the notification that the switching control to the EV traveling mode is in the disabled state to be made at a timing appropriate in accordance with a characteristic of each of the enabling conditions. In addition, setting the different measurement thresholds mt for the respective enabling conditions makes it possible to reduce an amount of information per one notification of the enabling condition that is not satisfied. This helps to secure a display region of a device such as the MFD 20, and also helps to perform easy-to-see display that is not confusing for the user.

In the vehicle control apparatus according to the first example embodiment, the measured time value may be a measured value of time during which one, of the enabling conditions, corresponding to the measured time value is determined as not being satisfied. For example, see step S140 in FIG. 6.

For example, the measured time value may be measured for each of the enabling conditions, and a control is performed of making the notification that the switching control to the EV traveling mode is in the disabled state, in response to that the measured time value of any of the enabling conditions exceeds the measurement threshold mt. This allows the notification that the switching control to the EV traveling mode is in the disabled state to be made at a timing appropriate in accordance with a characteristic of each of the enabling conditions.

In the vehicle control apparatus according to the second example embodiment, the measured time value may be a measured value of time measured from a timing at which the number of the enabling condition, of the two or more enabling conditions, that remains as not being satisfied becomes one. For example, see steps S223 and S226 in FIG. 9.

With this configuration, no notification that the switching control to the EV traveling mode is in the disabled state is made in a situation where two or more of the enabling conditions are not satisfied.

Accordingly, it is possible to reduce an amount of information per one notification of the enabling condition that is not satisfied. This helps to secure a display region of a device such as the MFD 20, and also helps to perform easy-to-see display that is not confusing for the user.

In the vehicle control apparatus according to the first example embodiment, the notification controller 53 may perform, in response to the notification request operation performed by the user, the control of making the notification of the enabling condition which the condition determining unit 51 determines as not being satisfied. For example, see steps S141 and S142 in FIG. 6.

With this configuration, the notification of the enabling condition that is determined as not being satisfied is made in response to the notification request operation performed by the user, even if the measured time value does not exceed the measurement threshold mt. Accordingly, the notification request operation performed by the user is prioritized, and the notification of the enabling condition that is not satisfied is made also in a case where the measured time value does not exceed the measurement threshold mt. This makes it possible for the user to confirm, at any timing, the cause that has brought the switching control to the EV traveling mode to the disabled state.

This is useful, for example, to identify a cause of malfunction of the vehicle in a case where the malfunction of the vehicle is preventing the switching control to the EV traveling mode.

The control unit 4 may display, for example, the enabling condition that is not satisfied on the MFD 20. On this occasion, the enabling condition may be displayed on the MFD 20 in a variety of ways. In one example, all of the enabling conditions having the flag F in the OFF state may be displayed. In another example, only part of the enabling conditions having the flag F in the OFF state may be displayed. In still another example, the enabling condition having the flag F that is in the OFF state for the longest period, i.e., the enabling condition corresponding to the timer TC that is performing the time count for the longest period, may be displayed.

In the vehicle control apparatus according to any one of the third to the fifth example embodiments, the notification controller 53 may vary the measurement threshold mt in accordance with the traveling environment. For example, see FIGS. 10 to 12.

Herein, the traveling environment refers to a cause inside or outside the vehicle that influences the switching control to the EV traveling mode. Non-limiting examples of the traveling environment may include the cause based on the condition of the internal equipment of the vehicle and the cause based on the outside environment such as the road data.

In one example, the measurement threshold mt1 of the enabling condition of the "internal resistance of the twelve-volt battery" may be varied in accordance with the temperature of the twelve-volt battery. This makes it possible to set the measurement threshold mt1 that is assumable for each environment in which the vehicle is present. This is useful, for example, in so setting the measurement threshold mt that malfunction is assumable when the measured time value becomes equal to or greater than the measurement threshold mt.

In another example, the measurement threshold mt4 of the enabling condition of the "vehicle speed" may be varied in accordance with the vehicle speed of the vehicle. This helps to prevent the notification that the switching control to the EV traveling mode is in the disabled state from being made at an excessively short cycle, thereby providing the user with a comfortable driving environment. In still another example, the measurement threshold mt of the enabling condition may be varied in accordance with the traveling environment of the vehicle in which the user is present. This helps to prevent the notification that the switching control to the EV traveling mode is in the disabled state from being made frequently, thereby providing the user with a comfortable driving environment.

In still another example, the measurement threshold mt of the enabling condition may be varied depending on whether a malfunction notification lamp is in an ON state. The malfunction notification lamp may make notification, by being in the ON state, that the vehicle involves some malfunction. For example, upon detecting some malfunction, the vehicle control apparatus may perform a control of turning on the malfunction notification lamp and may set the measurement threshold mt to a long period which the measured time value will not usually exceed.

In this case, the user who is driving the vehicle is able to recognize that the switching control to the EV traveling mode is not to be performed by checking the ON state of the malfunction notification lamp. This helps to prevent the notification that the switching control to the EV traveling is in the disabled state from being made in a case where the switching control to the EV traveling is apparently in the disabled state.

In one example, upon detecting some malfunction, the vehicle control apparatus may perform the control of turning on the malfunction notification lamp and may perform a control of suspending the notification that the switching control to the EV traveling is in the disabled state without varying the measurement threshold mt.

According to the example embodiments described above, the internal resistance of the twelve-volt battery, the SOC value of the high-voltage battery, the inclination rate of the slope, and the vehicle speed may be set as the enabling conditions as one example; however, the enabling conditions may be set to various conditions in accordance with a specification of the vehicle. For example, range data indicating various states of the shift lever such as D (driving) or P (parking) may be set as the enabling condition.

In this case, the hybrid control unit 4 may determine that the enabling condition is satisfied in a case where the shift lever is in a range that allows for the switching control to the EV traveling mode.

According to the example embodiments described above, a wording "the vehicle is in a driving state" and its variants refer to a situation where the vehicle is driven by a driver who is present in the vehicle. For example, a situation where the vehicle is in the driving state may involve a situation where the vehicle is traveling and a situation where the vehicle is temporarily stopped because of a traffic light or any other reason.

Moreover, the example embodiments described above refer to an example of the EV traveling mode in which the vehicle travels with use of the power from the rotating electrical device while the engine is stopped, as a non-limiting example of the engine stop mode described in the claims. However, the engine stop mode may be any mode in which the engine is stopped while the vehicle is in the driving state, and may involve other various examples.

In one example embodiment, the engine stop mode may be, for example but not limited to, a start-stop mode in which the engine of the vehicle is stopped to reduce unnecessary idling while the vehicle is temporarily stopped for a reason such as a traffic light.

In this case, two or more enabling conditions required for switching to the start-stop mode may be set. The vehicle control apparatus may compare a measured time value and a threshold with each other that are both related to the enabling condition, of the set two or more enabling conditions, which is determined as not being satisfied. The vehicle control apparatus may perform, in response to that the measured time value exceeds the threshold, a control of making notification that the switching control to the start-stop mode is in a disabled state.

Moreover, the vehicle control apparatus may perform the switching control to the start-stop mode in response to that all of the enabling conditions are determined as being satisfied.

Note that the effects described in the disclosure are merely illustrative and non-limiting. Any other effect may be achieved, or part of the effects described in the disclosure may be achieved.

Although some embodiments of the technology have been described in the foregoing by way of example with reference to the accompanying drawings, the technology is by no means limited to the embodiments described above. It should be appreciated that modifications and alterations may be made in accordance of a factor such as a design by persons skilled in the art without departing from the scope as defined by the appended claims. The technology is intended to include such modifications and alterations in so far as they fall within the scope of the appended claims or the equivalents thereof.

Each of the engine control unit 2, the brake control unit 3, the hybrid control unit 4, the driving-assist control unit 5, the display control unit 6, the rotating electrical device controller 15, and the charge controller 16 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the engine control unit 2, the brake control unit 3, the hybrid control unit 4, the driving-assist control unit 5, the display control unit 6, the rotating electrical device controller 15, and the charge controller 16 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine control unit 2, the brake control unit 3, the hybrid control unit 4, the driving-assist control unit 5, the display control unit 6, the rotating electrical device controller 15, and the charge controller 16 illustrated in FIG. 1.

The invention claimed is:

1. A vehicle control apparatus comprising:
    a condition determining unit configured to determine whether two or more enabling conditions are satisfied, the enabling conditions being set to enable a switching control to an engine stop mode, the switching control to the engine stop mode being a control of performing switching to the engine stop mode, the engine stop mode being a mode that stops an engine of a vehicle while the vehicle is in a driving state;
    a mode switching controller configured to perform the switching control to the engine stop mode in response to that the condition determining unit determines that the enabling conditions are satisfied; and
    a notification controller configured to compare a measured time value and a threshold with each other that are both related to the enabling condition, of the two or more enabling conditions, which the condition determining unit determines as not being satisfied, the notification controller being configured to perform, in response to that the measured time value exceeds the threshold, a control of making notification that the switching control to the engine stop mode is in a disabled state.

2. The vehicle control apparatus according to claim 1, wherein the engine stop mode comprises an electric vehicle traveling mode that causes the vehicle to travel with use of power from a rotating electrical device while the engine is stopped.

3. The vehicle control apparatus according to claim 1, wherein the notification controller is configured to perform, in response to that the measured time value exceeds the threshold, a control of making notification of the enabling condition that is determined as not being satisfied.

4. The vehicle control apparatus according to claim 2, wherein the notification controller is configured to perform, in response to that the measured time value exceeds the threshold, a control of making notification of the enabling condition that is determined as not being satisfied.

5. The vehicle control apparatus according to claim 1, wherein the threshold is set for each of the enabling conditions.

6. The vehicle control apparatus according to claim 2, wherein the threshold is set for each of the enabling conditions.

7. The vehicle control apparatus according to claim 1, wherein the measured time value comprises a measured value of time during which one, of the enabling conditions, corresponding to the measured time value is determined as not being satisfied.

8. The vehicle control apparatus according to claim 2, wherein the measured time value comprises a measured value of time during which one, of the enabling conditions, corresponding to the measured time value is determined as not being satisfied.

9. The vehicle control apparatus according to claim 1, wherein the measured time value comprises a measured value of time measured from a timing at which a number of the enabling condition, of the two or more enabling conditions, that remains as not being satisfied becomes one.

10. The vehicle control apparatus according to claim 2, wherein the measured time value comprises a measured value of time measured from a timing at which a number of the enabling condition, of the two or more enabling conditions, that remains as not being satisfied becomes one.

11. The vehicle control apparatus according to claim 1, wherein the notification controller is configured to perform, in response to notification request operation performed by a user, a control of making notification of the enabling condition which the condition determining unit determines as not being satisfied.

12. The vehicle control apparatus according to claim 2, wherein the notification controller is configured to perform, in response to notification request operation performed by a user, a control of making notification of the enabling condition which the condition determining unit determines as not being satisfied.

13. The vehicle control apparatus according to claim 11, wherein the notification controller is configured to perform, in a case where the notification controller detects the notification request operation, a control of making the notification of the enabling condition which the condition determining unit determines as not being satisfied, also when the measured time value does not exceed the threshold.

14. The vehicle control apparatus according to claim 12, wherein the notification controller is configured to perform, in a case where the notification controller detects the notification request operation, a control of making the notification of the enabling condition which the condition determining unit determines as not being satisfied, also when the measured time value does not exceed the threshold.

15. The vehicle control apparatus according to claim 1, wherein the notification controller is configured to vary the threshold in accordance with a traveling environment.

16. The vehicle control apparatus according to claim 2, wherein the notification controller is configured to vary the threshold in accordance with a traveling environment.

17. A vehicle control apparatus comprising
circuitry configured to
determine whether two or more enabling conditions are satisfied, the enabling conditions being set to enable a switching control to an engine stop mode, the switching control to the engine stop mode being a control of performing switching to the engine stop mode, the engine stop mode being a mode that stops an engine of a vehicle while the vehicle is in a driving state,
perform the switching control to the engine stop mode in response to that the enabling conditions are determined as being satisfied,
compare a measured time value and a threshold with each other that are both related to the enabling condition, of the two or more enabling conditions, which is determined as not being satisfied, and
perform, in response to that the measured time value exceeds the threshold, a control of making notification that the switching control to the engine stop mode is in a disabled state.

18. A vehicle control apparatus comprising:
a condition determining unit configured to determine whether two or more enabling conditions are satisfied, the enabling conditions being set to enable a switching control to an engine stop mode, the switching control to the engine stop mode being a control of performing switching to the engine stop mode, the engine stop mode being a mode'that stops an engine of a vehicle while the vehicle is in a driving state;

a mode switching controller configured to perform the switching control to the engine stop mode in response to that the condition determining unit determines that the enabling conditions are satisfied;

a display control unit configured to perform a display control to display on a display device of the vehicle that the switching control to the engine stop mode is in a disabled state; and a notification controller configured to compare a measured time value and a threshold with each other that are both related to the enabling condition, of the two or more enabling conditions, which the condition determining unit determines as not being satisfied, the notification controller being configured to permit, in response to that the measured time value exceeds the threshold, a performance of the display control by the display control unit, the notification controller being configured to prohibit, in response to that the measured time value does not exceed the threshold, the performance of the display control by the display control unit.

19. The vehicle control apparatus according to claim 18, wherein the measured time value comprises a measured value of time during which one, of the enabling conditions, corresponding to the measured time value is determined as not being satisfied,
wherein the threshold is set for each of the enabling conditions.

20. The vehicle control apparatus according to claim 18, wherein the measured time value comprises a measured value of time measured from a timing at which a number of the enabling condition, of the two or more enabling conditions, that remains as not being satisfied becomes one.

* * * * *